(12) United States Patent
Wang

(10) Patent No.: US 10,990,273 B2
(45) Date of Patent: Apr. 27, 2021

(54) ULTRA TOUCH FUNCTIONS AND SYSTEMS INCORPORATING THE SAME

(71) Applicant: Yong Wang, Fremont, CA (US)

(72) Inventor: Yong Wang, Fremont, CA (US)

(*) Notice: Subject to any disclaimer, the term of this patent is extended or adjusted under 35 U.S.C. 154(b) by 192 days.

(21) Appl. No.: 16/286,441

(22) Filed: Feb. 26, 2019

(65) Prior Publication Data

US 2020/0272321 A1    Aug. 27, 2020

(51) Int. Cl.
*G06F 3/0488* (2013.01)
*G06F 3/0354* (2013.01)
*G06F 3/0482* (2013.01)

(52) U.S. Cl.
CPC ...... *G06F 3/04883* (2013.01); *G06F 3/03543* (2013.01); *G06F 3/03545* (2013.01); *G06F 3/0482* (2013.01); *G06F 2203/04808* (2013.01)

(58) Field of Classification Search
CPC .... G06F 3/04883; G06F 3/017; G06F 3/0488; G06F 3/0482; G06F 3/0485; G06F 3/011; G06F 3/04842; G06F 3/04847; G06F 3/04817; G06F 3/0346; G06F 3/0416; G06F 3/04815; G06F 3/016; G06F 3/04845; G06F 3/0486; G06F 3/04886; G06F 2203/04105; G06F 2203/04808; G06F 3/013; G06F 3/014; G06F 3/0484; G06F 3/167; G06F 16/7837; G06F 1/163; G06F 3/0481; G06F 2203/04806; G06F 3/0304; G06F 3/0483; G06F 1/1694; G06F 2203/04803; G06F 3/012; G06F 3/015; G06F 3/03547; G06F 3/038; G06F 3/0414; G06F 21/32; G06F 3/0219; G06F 3/0236; G06F 3/03545; G06F 3/0487; G06F 8/38; G06F 9/451; G06F 1/1626; G06F 1/1686; G06F 1/3265; G06F 2200/1636; G06F 2203/014; G06F 2203/0381; G06F 3/00; G06F 3/005; G06F 3/02; G06F 3/0202; G06F 3/0213; G06F 3/0354; G06F 3/0412; G06F 3/04812; G06F 3/14; G06F 3/1423; G06F 40/274;

(Continued)

(56) References Cited

U.S. PATENT DOCUMENTS 5,809,267 A * 9/1998 Moran ................ G06F 3/04883
                                                 715/863
5,825,352 A * 10/1998 Bisset ................ G06F 3/04186
                                                 345/173

(Continued)

*Primary Examiner* — Sheree N Brown

(57) ABSTRACT

A computer system with ultra touch functions comprises a pointing input device with an ultra touch control button and a computer input device application program configured to execute the ordinary input device function when ultra_Mode="Ordinary"; select specific ultras touch type and set ultra_Mode="Gesture" when the movement pattern of the type-select operation matches a predefined type pattern; specify a plurality of ultra touch gestures from the operations on the input device button and movement; specify a plurality of ultra touch gesture functions for every ultra touch type wherein each ultra touch gesture function is driven by its respective ultra touch gesture; execute the specific ultra touch gesture function for the selected ultra touch type when detected its respective ultra touch gesture during ultra_Mode="Gesture"; set ultra_Mode="Ordinary" whenever detected an ultra touch end operation.

19 Claims, 15 Drawing Sheets

(58) Field of Classification Search
CPC ..... G06F 8/31; G06F 8/33; G06F 9/44; G06F 9/445; G06F 11/3438; G06F 15/00; G06F 16/215; G06F 16/248; G06F 16/735; G06F 16/738; G06F 16/743; G06F 16/9038; G06F 16/904; G06F 16/951; G06F 16/9535; G06F 16/957; G06F 17/18; G06F 19/00; G06F 1/16; G06F 1/1643; G06F 1/1656; G06F 1/1684; G06F 1/169; G06F 1/1692; G06F 1/1698; G06F 1/3218; G06F 1/3234; G06F 2009/45595; G06F 21/10; G06F 21/31; G06F 21/316; G06F 21/36; G06F 21/6218; G06F 21/6263; G06F 2200/1637; G06F 2203/0339; G06F 2203/0384; G06F 2203/04104; G06F 2203/04106; G06F 2203/04801; G06F 2203/04802; G06F 3/01; G06F 3/0227; G06F 3/0237; G06F 3/0238; G06F 3/03; G06F 3/0325; G06F 3/033; G06F 3/0334; G06F 3/03543; G06F 3/0362; G06F 3/0383; G06F 3/041; G06F 3/04166; G06F 3/042; G06F 3/0425; G06F 3/0426; G06F 3/044; G06F 3/0443; G06F 3/045; G06F 3/04855; G06F 40/166; G06F 40/171; G06F 40/177; G06F 40/205; G06F 40/268; G06F 8/34; G06F 9/3017; G06F 9/3836; G06F 9/45558; G06F 9/541

USPC .......................................................... 715/863

See application file for complete search history.

(56) References Cited

U.S. PATENT DOCUMENTS

| | | | | |
|---|---|---|---|---|
| 9,116,558 B2 * | 8/2015 | Yilmaz | ............... | G06F 3/03545 |
| 9,164,603 B2 * | 10/2015 | Pedersen | ............... | G06F 3/0383 |
| 9,411,462 B2 * | 8/2016 | Wright | ............... | G06F 3/04166 |
| 9,465,457 B2 * | 10/2016 | Thompson | ........... | G06F 3/04883 |
| 9,639,186 B2 * | 5/2017 | Thompson | ............... | G06F 3/038 |
| 9,996,176 B2 * | 6/2018 | Zotov | ............... | G06F 3/04883 |
| 2006/0274044 A1 * | 12/2006 | Gikandi | ............... | G06F 3/03543 345/163 |
| 2008/0238887 A1 * | 10/2008 | Love | ............... | G06F 3/03545 345/179 |
| 2014/0015782 A1 * | 1/2014 | Kim | ............... | G06K 9/00422 345/173 |
| 2015/0205391 A1 * | 7/2015 | Chang | ............... | G06F 3/04162 345/173 |
| 2015/0363012 A1 * | 12/2015 | Sundara-Rajan | ... | G06F 3/04162 345/179 |

* cited by examiner

Table 1: One-Segment Ultra Touch Type Patterns

| Type # | Type 1 | Type 2 | Type 3 | Type 4 |
|---|---|---|---|---|
| k1k2k3 | 001 | 002 | 003 | 004 |

FIG. 8A

Table 2: Two-Segment Ultra Touch Type Patterns

| Type # | k1k2k3 | Type # | k1k2k3 | Type # | k1k2k3 |
|---|---|---|---|---|---|
| Type 5 | 013 | Type 9 | 012 | Type 13 | 032 |
| Type 6 | 024 | Type 10 | 014 | Type 14 | 034 |
| Type 7 | 031 | Type 11 | 021 | Type 15 | 041 |
| Type 8 | 042 | Type 12 | 023 | Type 16 | 043 |

FIG. 8B

Table 3: Three-Segment Ultra Touch Type Patterns

| Type # | k1k2k3 | Type # | k1k2k3 | Type # | k1k2k3 |
|---|---|---|---|---|---|
| Type 17 | 131 | Type 29 | 121 | Type 41 | 321 |
| Type 18 | 132 | Type 30 | 123 | Type 42 | 323 |
| Type 19 | 134 | Type 31 | 124 | Type 43 | 324 |
| Type 20 | 241 | Type 32 | 141 | Type 44 | 341 |
| Type 21 | 242 | Type 33 | 142 | Type 45 | 342 |
| Type 22 | 243 | Type 34 | 143 | Type 46 | 343 |
| Type 23 | 312 | Type 35 | 212 | Type 47 | 412 |
| Type 24 | 313 | Type 36 | 213 | Type 48 | 413 |
| Type 25 | 314 | Type 37 | 214 | Type 49 | 414 |
| Type 26 | 421 | Type 38 | 231 | Type 50 | 431 |
| Type 27 | 423 | Type 39 | 232 | Type 51 | 432 |
| Type 28 | 424 | Type 40 | 234 | Type 52 | 434 |

FIG. 8C

Table 4: Letter & Number Type Pattern Index Assignment

| Type # | Type pattern | Type # | Type pattern | Type # | Type pattern |
|---|---|---|---|---|---|
| Type 1 | 1 | Type 7 | 7 | Type 13 | d |
| Type 2 | 2 | Type 8 | 8 | Type 14 | e |
| Type 3 | 3 | Type 9 | 9 | Type 15 | f |
| Type 4 | 4 | Type 10 | a | Type 16 | g |
| Type 5 | 5 | Type 11 | b | Type 17 | h |
| Type 6 | 6 | Type 12 | c | Type 18 | i |

FIG. 10

Table 5: Basic Ultra Touch Gesture List

| Ultra Touch Gesture # | Mouse operation | Stylus pen operation |
|---|---|---|
| C1 | click left button | tap the stylus |
| C2 | double click left button | double tap the stylus |
| C3 | press and hold left button | tap and hold the stylus |
| M | move mouse while holding left button | move stylus |
| Mv | move mouse up/down while holding left button | move stylus up/down |
| Mh | move mouse right/left while holding left button | move stylus right/left |
| Mup | move mouse upward while holding left button | move stylus upward |
| Mdown | move mouse downward while holding left button | move stylus downward |
| Mright | move mouse to right while holding left button | move stylus to the right |
| Mleft | move mouse leftward while holding left button | move stylus leftward |
| Scw | scroll wheel | no |
| Cr1 | click right button | |
| Cr2 | double click right button | |
| Cr3 | press and hold right button | |
| Mr | move mouse while holding right button | |
| Mrv | move mouse up/down while holding right button | |
| Mrh | move mouse right/left while holding right button | |
| Mrup | move mouse upward while holding right button | |
| Mrdown | move mouse downward while holding right button | |
| Mrright | move mouse to right while holding right button | |
| Mrleft | move mouse leftward while holding right button | |

FIG. 11

Table 6: Ultra Touch Gesture Function Table for the Mouse w/ left, right buttons and an ultra touch control button

| Type # | Ultra Touch Gesture # | Ultra Touch Gesture Function |
|---|---|---|
| Type 1 (001) | C1 | One-finger tap |
| | C2 | One-finger double tap |
| | C3 | One-finger long press |
| | M | One-finger drag |
| | Cr1 | Two-finger tap |
| | Cr2 | Two-finger double tap |
| | Cr3 | Sw to previous type |
| | Mr | Two-finger drag |
| Type 2 (002) | C1 | Three-finger tap |
| | C2 | Three-finger double tap |
| | C3 | Three-finger long press |
| | M | Three-finger drag |
| | Cr1 | Four-finger tap |
| | Cr2 | Four-finger double tap |
| | Cr3 | Sw to Type 1 |
| | Mr | Four-finger drag |
| Type 3 (003) | C1 | Backward Page |
| | Cr1 | Forward Page |
| | C2 | PgUp |
| | Cr2 | PgDn |
| | C3 | Home |
| | Cr3 | Sw to Type 1 |
| | M | Scroll (all directional) |
| | Mrv | Spread / pinch (Zoom) |
| | Mrh | Rotate |
| Type 4 (004) | C1 | Enter |
| | Cr1 | Esc |
| | C2 | Undo |
| | Cr2 | Redo |
| | C3 | Delete |
| | Cr3 | Sw to Type 1 |
| | M | Eraser |
| | Mrv | Volume |
| | Mrh | Brightness |

FIG. 12A

Table 6: Ultra Touch Gesture Function Table for the Mouse w/ left, right buttons and an ultra touch control button (Continue)

| Type # | Ultra Touch Gesture # | Ultra Touch Gesture Function | |
|---|---|---|---|
| Type 5 (013) | C1 | Web Refresh (F5) | |
| | C2 | Open 'Firefox' | ● |
| | C3 | Open 'One Note' | ● |
| | Mup | Home | |
| | Mdown | End | |
| | Mleft | Backward Page | |
| | Mright | Forward Page | |
| | Cr1 | Display gesture function table | ● |
| | Cr2 | Real size DPI | ● |
| | Cr3 | Sw to Type 1 | |
| | Mrup | Undo | |
| | Mrdown | Redo | |
| | Mrleft | BackSpace | |
| | Mrright | Delete | |

FIG. 12B

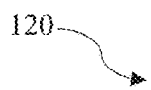

FIG. 12C

Table 7: Ultra Touch Gesture Function Table for the Mini Mouse, Digital Stylus Pen

| Type # | Ultra Touch Gesture # | Gesture Function |
|---|---|---|
| Type 1 (001) | C1 | One-finger tap |
|  | C2 | One-finger double tap |
|  | C3 | Sw to previous type |
|  | M | One-finger drag |
| Type 2 (002) | C1 | Two-finger tap |
|  | C2 | Two-finger double tap |
|  | C3 | Sw to Type 1 |
|  | M | Two-finger drag |
| Type 3 (003) | C1 | Three-finger tap |
|  | C2 | Three-finger double tap |
|  | C3 | Sw to Type 1 |
|  | M | Three-finger drag |
| Type 4 (004) | C1 | Four-finger tap |
|  | C2 | Four-finger double tap |
|  | C3 | Sw to Type 1 |
|  | M | Four-finger drag |
| Type 5 (013) | C1 | Enter |
|  | C2 | Undo |
|  | C3 | Sw to Type 1 |
|  | Mv | Zoom in/out |
|  | Mh | Rotate |
| Type 6 (024) | C1 | PgUp |
|  | C2 | PgDn |
|  | C3 | Sw to Type 1 |
|  | M | Scroll (all directional) |
| Type 7 (031) | C1 | Pause Media |
|  | C2 | Next Media |
|  | C3 | Sw to Type 1 |
|  | Mv | Volume (up/down) |
|  | Mh | Brightness (high/low) |
| Type 8 (042) | C1 | Undo |
|  | C2 | Redo |
|  | C3 | Sw to Type 1 |
|  | M | Eraser |

FIG. 13A

Table 7: Ultra Touch Gesture Function Table for the Mini Mouse, Digital Stylus Pen (Continue)

| Type # | Ultra Touch Gesture # | Ultra Touch Gesture Function | |
|---|---|---|---|
| Type 9 (012) | C1 | Open 'One Note' | ● |
| | C2 | Open 'Firefox' | ● |
| | C3 | Sw to Type 1 | |
| | Mup | Home | |
| | Mdown | End | |
| | Mleft | Backward Page | |
| | Mright | Forward Page | |
| Type 10 (014) | C1 | Display gesture function table | ● |
| | C2 | Real size DPI | ● |
| | C3 | Sw to Type 1 | |
| | Mup | Undo | |
| | Mdown | Redo | |
| | Mleft | BackSpace | |
| | Mright | Delete | |
| Type 11 | 0 | TBD | |
| Type 12 (023) | C1 | One-finger tap | |
| | C2 | One-finger double tap | |
| | C3 | Sw to Type 13 | |
| | M | One-finger drag | |
| Type 13 (032) | C1 | Enter | |
| | C2 | Undo | |
| | C3 | Sw to Type 14 | |
| | Mup | Zoom in/out | |
| | Mdown | Rotate | |
| Type 14 (034) | C1 | Web Refresh (F5) | |
| | C2 | Home | |
| | C3 | Sw to Type 12 | |
| | Mup | PgUp | |
| | Mdown | PgDn | |
| | Mleft | Backward Page | |
| | Mright | Forward Page | |

FIG. 13B

ULTRA TOUCH FUNCTIONS AND SYSTEMS INCORPORATING THE SAME

BACKGROUND OF THE INVENTION

1. Field of the Invention

The present invention relates to a computer input device function. More particularly, the present invention relates to the ultra touch functions for the computer handheld pointing input devices such as mouse and digital stylus wherein the ultra touch gesture functions include most of multi-touch functions and system functions.

2. Description of the Related Art

In computing, multi-touch is technology that enables a trackpad or touchpad to recognize the presence of more than one or more than two points of contact with the surface. Multi-touch was in use as early as 1985. Apple popularized the term "multi-touch" in 2007. The multi-touch touchpads on the laptops can sense in some cases up to five fingers simultaneously, providing more user-friendly options for input, such as the ability to bring up the context menu by tapping two fingers, dragging two fingers for scrolling, or gestures for zoom in/out or rotate.

A computer mouse is a handheld pointing device used for position a cursor on a computer display screen. Making the computer mouse to have multi-touch function has been always what people want. The magic mouse was first sold on October, 2009 by Apple. It is a mouse with multi-touch surface and gesture support. It allows the use of gesture such as swiping across the top surface of the mouse to interact with desktop computer. It also presents the functions of the vertical, horizontal and diagonal scrolling. Microsoft update its arc mouse in 2017 with a large capacitive touch surface on the top of mouse. It has the ability to scroll both vertically and horizontally.

SUMMARY OF THE INVENTION

The invention relates, in one embodiment, the method and systems for the ultra touch gesture functions. An ultra touch control button said U disposed on the computer mouse and a control variable ultra_Mode are used to control computer mouse working in three modes supported by the computer mouse device application program: (1) the mouse works in the ordinary when ultra_Mode="Ordinary"; (2) the mouse works in the ultra touch type selection mode when ultra_Mode="Select". The type-select operation is specified as moving the mouse while holding the ultra touch control button U. When selected an ultra touch type by the type-select operation, the selected type is saved and the ultra_Mode is set to "Gesture"; (3) the mouse works in the ultra touch gesture function mode when ultra_Mode="Gesture". A group ultra touch gestures are specified for the ultra touch gesture function mode. Every ultra touch type can include a group of ultra touch gesture functions wherein each ultra touch gesture function is driven by its respective ultra touch gesture. All specified ultra touch gestures for the selected type can be used repeatedly until an ultra touch end operation. The ultra touch end operation is specified as clicking the ultra touch control button U during the ultra touch gesture function mode. The ultra touch end operation sets the ultra_Mode to "Ordinary" and makes the mouse working in the ordinary mode. Every ultra touch gesture function has an auto-ending property. If the auto-ending property is set to on, an ultra touch end operation is triggered automatically at the end of the ultra touch gesture function. The mouse mode could be returned from the ordinary mode to the ultra touch gesture functions mode by an ultra touch flash-back operation which is specified as long press the ultra touch control button U during the ordinary mode. The flash-back operation sets ultra_Mode to "Gesture" and makes mouse work in the ultra touch gesture function mode with the previous ultra touch type. For any ultra touch type, an ultra touch gesture function could be configured as the quick type switching which changes the type to the specified type. One ultra touch gesture function is specified as toggling a control variable func_Table between on and off; display the ultra touch gesture function table to help selecting the ultra touch type when func_Table=on and ultra_Mode="Select"; display the ultra touch gesture function list to help selecting the ultra touch gesture for the selected ultra touch type when func_Table=on and ultra_Mode="Gesture"; hide the ultra touch gesture function table when func_Table=off or ultra_Mode is "Ordinary".

The invention relates, in one embodiment, to ultra touch type quick switching. Several ultra touch types are group together, each of which contains a gesture function for quick switching to the next type in the group. All the type switching functions in the group form a loop link. All the ultra touch gesture functions in the group can be used to support a specific application such as web browsing or word editing. Using the type switching function to change the ultra touch type in the group is easier and fast.

The invention relates, in one embodiment, to ultra touch type selection. Each ultra touch type pattern is an alphanumeric character such as Type 1 "1", Type 2 "2", Type 10 "a", Type 16 "g". For the mouse device, some multi-stroke alphanumeric letters such as Type 4 "4", Type 15 "f" and Type 18 "i" can be replace replaced by a similar unique single stroke pattern.

The invention relates, in one embodiment, to ultra touch type selection, Each ultra touch type pattern in the pre-defined ultra touch type patterns consists of one to three directed line segments wherein each segment is either vertical or horizontal and the second directed segment has different direction from other segments. Up to 52 ultra touch type patterns can be defined and used.

The invention relates, in one embodiment, to the method of the type-select operation recognition. The type-select operation draws one to three directed segments to select a specific ultra touch type. A segment drawn in type-select operation is recognized as vertical when the segment vector (X, Y) meets the inequality $|Y|>A|X|$ wherein $A>1$. A segment drawn in type-select operation is recognized as horizontal when the segment vector (X, Y) meets the inequality $|X|>A|Y|$ wherein $A>1$. A segment drawn in type-select operation is ignored when it is neither vertical nor horizontal. A drawn segment shorter than a preconfigured value in pixel is ignored in type-select operation.

The invention relates, in one embodiment, to the ultra touch gesture operations for the computer mouse with left and right buttons and an ultra touch control button U: (1) click left or right button; (2) double click left or right button; (3) press and hold left or right button; (4) move mouse while holding left or right button and (5) scroll the mouse wheel. Moving mouse while holding left or right button can be separated into two independent gesture operations: moving mouse vertically and move mouse horizontally while holding left or right button. Furthermore, it can be separated into four independent gesture operations: moving mouse upward; moving mouse downward; moving mouse leftward and moving mouse to the right while holding left or right button. Maximum 14 ultra touch gesture functions can be specified for each ultra touch type.

The invention relates, in one embodiment, to the ultra touch gesture operations for mini mouse or pen mouse with left button and an ultra touch control button U: (1) click left button; (2) double click left button; (3) press and hold left button and (4) move mouse while holding left button. Moving mouse while holding left button can be separated into two independent gesture operations: moving mouse vertically and move mouse horizontally while holding left button. Furthermore, it can be separated into four independent gesture operations: moving mouse upward; moving mouse downward; moving mouse leftward and moving mouse to the right while holding left button. Maximum 7 ultra touch gesture functions can be specified for each ultra touch type.

The invention relates, in one embodiment, to the idea and method of "Real size DPI". A software DPI adjusting coefficient C is introduced to adjust the cursor displacement distance in inch on the display to the same as the mouse movement distance in inch on the mouse mat during handwritten and drawing: C=:DPId/DPIm wherein DPid is DPI of the display device and DPIm is DPI of the computer mouse. In "Real size DPI" ode", computer adjusts the cursor displacement (X, Y) to the new "Real size" cursor displacement (X1, Y1) where X1=C*X; Y1=C*Y.

The invention relates, in one embodiment, to a computer digital stylus pen or pencil with the ultra touch gesture functions. With the ultra touch control button U and the computer stylus device application program, the digital stylus pen works in three modes: (1) ordinary pen mode; (2) ultra touch type selection mode and (3) ultra touch gesture function mode. The type-select operation is specified as moving the stylus pen or pencil on the touchscreen while holding the ultra touch control button U. the type-select operation ends with releasing the control button U during the type-select operation. If the drawn pattern during the type-select operation matches a predefined type pattern, the pre-defined type is selected and ultra_Mode is set to "Gesture". Then stylus works in the ultra touch gesture function mode. A group of ultra touch gesture functions are specified for each ultra touch type and each gesture function is driven by an individual ultra touch gesture. all specified ultra touch gestures can he used repeatedly until an ultra touch end operation. The ultra touch end operation is specified as clicking the control button U during the ultra touch gesture function mode. Every ultra touch gesture function has an auto-ending property. If the auto-ending property is set to on, an ultra touch end operation is triggered automatically at the end of the associated ultra touch gesture function that makes stylus work in the ordinary mode. The stylus mode could be returned from the ordinary mode to the ultra touch gesture functions mode by an ultra touch flash-back operation which is specified as long press the ultra touch control button U during the ordinary mode. The flash-back operation sets ultra_Mode to "Gesture" and makes stylus work in the ultra touch gesture function mode with the previous ultra touch type. One ultra touch gesture function is specified as displaying ultra touch gesture function table which helps selecting the ultra touch type during the type selection and displaying ultra touch gesture function list of the selected type which helps selecting the ultra touch gestures in the gesture function mode.

The invention relates, in one embodiment, to the ultra touch gesture operations for the digital stylus pen or pencil with only one button—an ultra touch control button U: (1) tap pen on the touchscreen; (2) double tap on the touchscreen; (3) long press pen on the touchscreen and (4) move pen on the touchscreen. Moving pen on the touchscreen can be separated into two independent gesture operations: moving pen vertically and move pen horizontally on the touchscreen. Furthermore, it can be separated into four independent gesture operations: moving pen upward; moving pen downward; moving pen leftward and moving pen to the right on the touchscreen. Maximum 7 ultra touch gesture functions can be specified for each ultra touch type.

The ultra touch gesture functions include most of the multi-touch tap gestures, multi-touch drag-gestures, spread/pinch gesture for zoom in/out gesture, rotation gesture and pre-configured system functions. In addition, the ultra touch gesture functions include many system tool functions and commands.

For computer mouse, the ultra touch gesture functions enable most of the multi-touch touchscreen function working on the mouse mat by easy mouse operation. The ultra touch gesture function can remove the physical scroll wheel from the computer mouse and replace it with more powerful all directional scroll function and all directional drag function, it makes the mini mouse and pen mouse more powerful and practical.

For the computer digital stylus pen or pencil, the ultra touch function extends the stylus pen or pencil to having most of the multi-touch functions which used to be operated by fingers. In addition, the ultra touch gesture functions enhance the stylus pen with many useful shortcut functions. It helps the user using the stylus to finish their most of the work without switching back and forth between putting down the stylus for using their fingers to operations on the touchscreen and picking up the stylus after multi-touching operation. This makes their work more comfortable and smoother.

More important, the methods introduced in the invention for the ultra touch gesture functions enable both the computer mouse and the computer stylus pen perform most multi-touch gesture functions for the touchscreen and many additional system functions in a similar way.

BRIEF DESCRIPTION OF THE DRAWINGS

FIG. 8A 8C show the example of type pattern assignment for one to three directed line segments.

FIG. 10 is an example of the alphanumeric letters for the ultra touch type patterns.

FIG. 11 is the basic ultra touch gesture list for computer mouse and stylus pen or pencil.

FIG. 12A and 12B are the ultra touch gesture function table for the mouse with left/right buttons and an ultra touch control button U.

FIG. 12C is the ultra touch gesture function list for the ultra touch type 3 in the table 6.

FIGS. 13A and 13B are the ultra touch gesture function table for the mini mouse, pen mouse and digital stylus pen.

DETAILED DESCRIPTION OF THE INVENTION

The invention generally provides a method and system for computer mouse or computer digital stylus pen (or pencil) to have the ultra touch functions. The ultra touch gesture functions can include most multi-touch function used on the touchpad or touchscreen. Some embodiments of the invention are discussed below with reference to FIGS. 1~14, In an effort to provide a concise description of these embodiments, not all features of an actual implementation are described in the specification.

Figure 1:
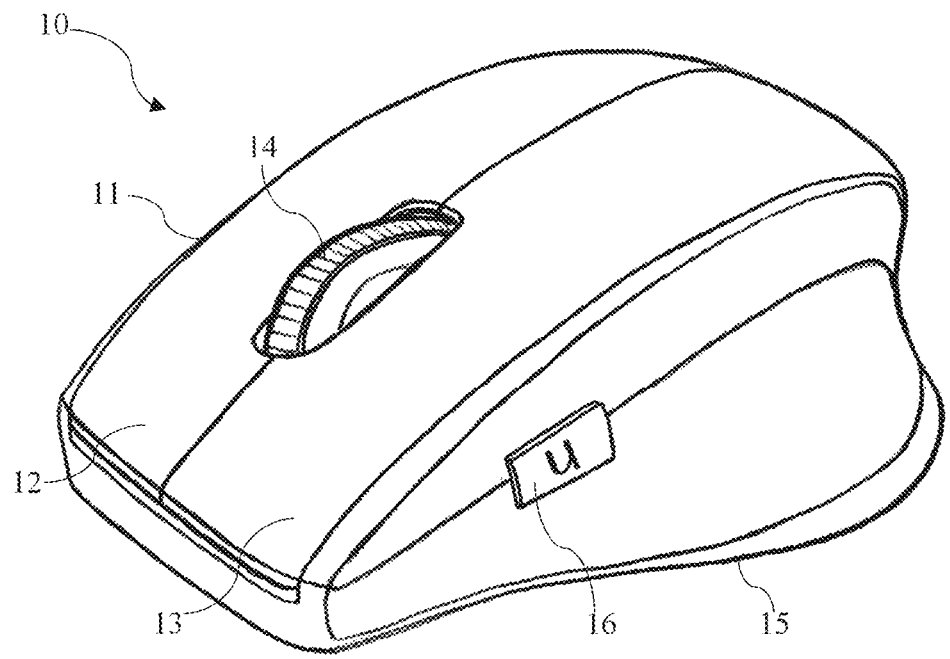
FIG. 1 is a perspective view of a computer mouse with left/right buttons, scroll wheel and an ultra touch control button U.

FIG. 1 is a computer mouse 10, in accordance with one embodiment of the present invention. The mouse has the optical sensor at the mouse base 15, left button 12, right button 13, scroll wheel 14 and an ultra touch control button 16 (said U) which is disposed on the thumb side wall of the mouse body 11. It could be disposed in other location of the mouse body 11 for operational comfort.

With the ultra touch control button U and the computer mouse device application program, the mouse with the ultra touch function works in three modes: (1) ordinary mode; (2) ultra touch type selection mode; (3) ultra touch gesture function mode.

The type-select operation is specified as moving mouse 10 while holding the ultra touch control button U by following one predefined type pattern. The type-select operation ends when the control button U is released. At the beginning of the type-select operation, ultra_Mode is set to "Select". The mouse movement data is saved during the type-select operation. At the end of the type-select operation, the computer mouse device application program compares the saved mouse movement data with the predefined ultra touch type pattern set to find if it matches one of the type pattern. If a matching type pattern is found, the matching type is selected. The selected type is saved and the ultra_Mode value is set to "Gesture". Then the mouse starts working in ultra touch gesture function mode for the selected type.

An ultra touch gesture function table is specified as Table 6 shown in FIGS. 12A and 12B which specifies a group of ultra touch gestures functions for each ultra touch type, where each ultra touch gestures function corresponds a specific gesture. For examples: after selecting the ultra touch type 1 (001) shown in FIG. 12A, the gesture C1 (click left button) triggers one-finger tap gesture function at the cursor position and functions totally same as one-finger tap gesture on the touchscreen; the gesture C2 (double click left button) triggers one-finger double tap gesture function at the cursor position; the gesture Cr1 (click right button) triggers two-finger tap gesture at the cursor position. The gesture M (moving mouse while pressing and holding the left button) functions as one-finger drag gesture at the cursor position and functions totally same as one-finger drag gesture on the touchscreen; the gesture Mr (moving mouse while pressing and holding the right button) functions as two-finger drag gesture at the cursor position and functions totally same as two-finger drag gesture on the touchscreen.

When mouse works in the ultra touch gesture function mode, the normal mouse movement when no mouse button is pressed can move the cursor on the display. This cursor displacement gives the mouse the capability to locate the ultra touch point on the display.

The ultra touch end operation is specified as clicking the ultra touch control button U during the ultra touch gesture function mode. It sets ultra_Mode to "Ordinary".

When mouse works in the ordinary mode, an ultra touch flash-back operation (long press the control button U) sets ultra_Mode to "Gesture" to make mouse work in the ultra touch gesture function mode with the ultra touch type ultra_Type.

Figure 2A:
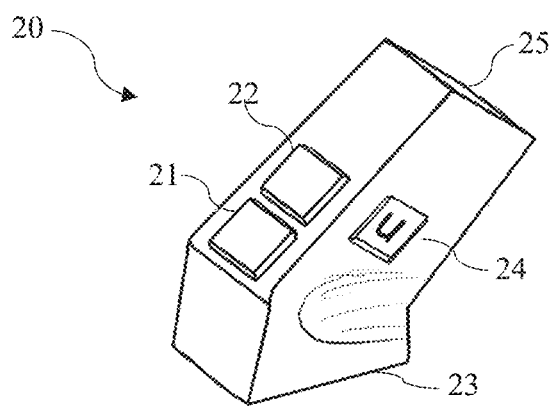
FIG. 2A is a perspective view of a mini computer mouse with left button, right button and an ultra touch control button U.

FIG. 2A is a mini computer mouse 20, in accordance with the present invention. The mini mouse 20 has an optical sensor on the mouse base 23, left button 21, right button 22 and an ultra touch control button 24 (said button U). The cover of the batter compartment is on the top side 25 of the mini mouse. When the rechargeable battery is used, the mini mouse can be made even smaller.

The right button clicking function of the mouse 20 is specified as clicking the ultra touch control button 24 when mouse works in the ordinary mode.

An ultra touch gesture function table is specified as Table 6 shown in FIGS. 12A and 12B which specifies a group of ultra touch gestures functions for each ultra touch type, wherein each ultra. touch gestures function corresponds a specific gesture. The ultra touch gesture functions and operations for the mini mouse 20 are total same as that for the mouse 10 shown in FIG. 1.

Figure 2B:
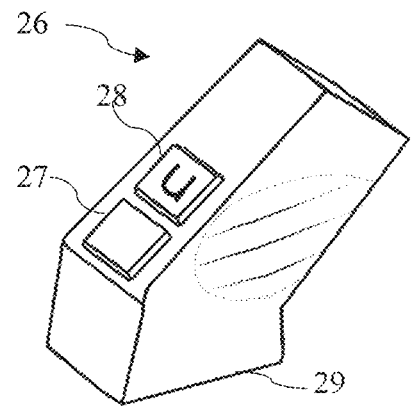
FIG. 2B is a perspective view of a mini computer mouse with left button and an ultra touch control button U.

FIG. 2B is a mini computer mouse 26, in accordance with the present invention. The mini mouse 26 has an optical sensor on the mouse base 29, left button 27 and an ultra touch control button 28 (said button U).

The right button clicking function of the mouse 26 is specified as clicking the ultra touch control button 28 when mouse works in the ordinary mode.

An ultra touch gesture function table is specified as Table 7 shown in FIGS. 13A and 13B which specifies a group of ultra touch gestures functions for each ultra touch type, where each ultra touch gestures function corresponds a specific gesture. For examples: after selecting the ultra touch type 6 (024) shown in FIG. 13A, the gesture C1 (click left button) triggers "PgUp" command; the gesture C2 (double click left button) triggers "PgDn" command, The gesture M (moving mouse while pressing and holding the left button) drives the all directional scroll function.

The vertical scroll function of the mouse scroll wheel is replaced by a more powerful ultra touch gesture function—an all directional scroll gesture function wherein the component Y of mouse movement (X, Y) drives the vertical scrolling of the display and the component X of mouse movement (X, Y) drives the horizontal scrolling of the display; It presents the functions of the vertical, horizontal and diagonal scrolling. Table 7 includes another useful ultra touch gesture function "One-finger drag gesture function" in Type 1. After selecting Type 1, the gesture M can drag the display at any direction. This give users more fun and more controllability in operation. Replacing the physical scroll wheel by the ultra touch gesture functions makes mini mouse and pen mouse smaller and more powerful. In turn, the miniaturization of the computer mouse can help improve operability of the ultra touch type selection and the ultra touch gestures.

During the ordinary mode, an ultra touch flash-back operation sets ultra_Mode to "Gesture" and back to the ultra touch gesture function mode with the ultra touch type ultra_Type.

When mouse works in the ultra touch gesture function mode, the normal mouse movement when no mouse button is pressed is reported as a normal cursor displacement event.

In Table 7 which is used for the computer mini mouse 20, 13 ultra touch types are configured. Up to 7 ultra touch gesture functions can be included for each ultra touch type. More ultra touch types could be configured and used to expanding the ultra touch function table.

When the auto-ending property is set to on for an ultra touch gesture function, an ultra touch end operation will be automatically triggered at the end of the associated ultra touch gesture.

Figure 14A:
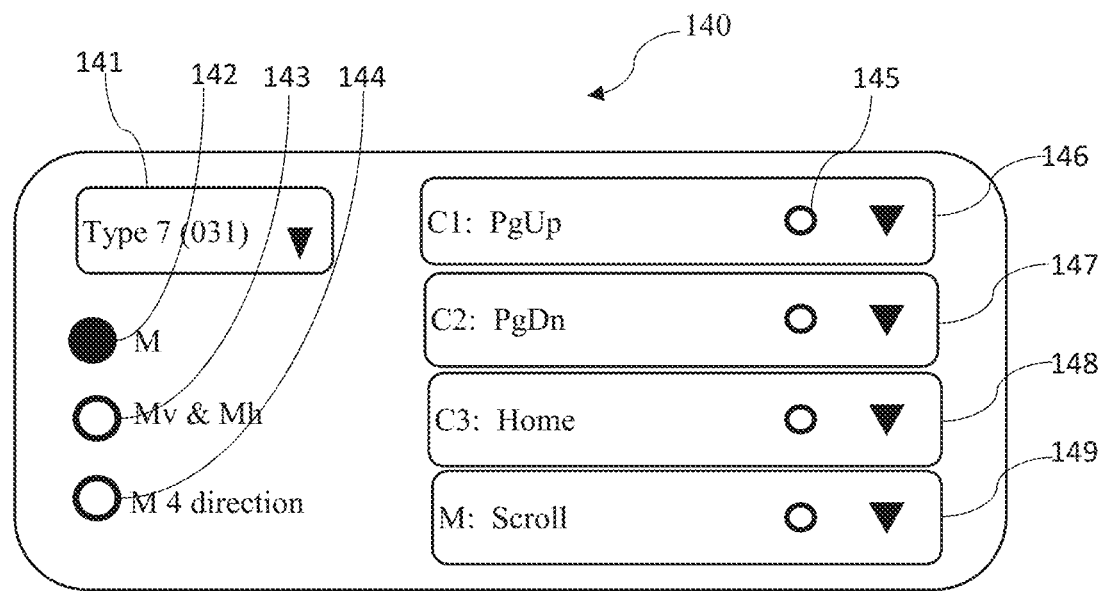
FIG. 14A and FIG. 14B are the user configure interface for the ultra touch gesture function table.
Figure 14B:
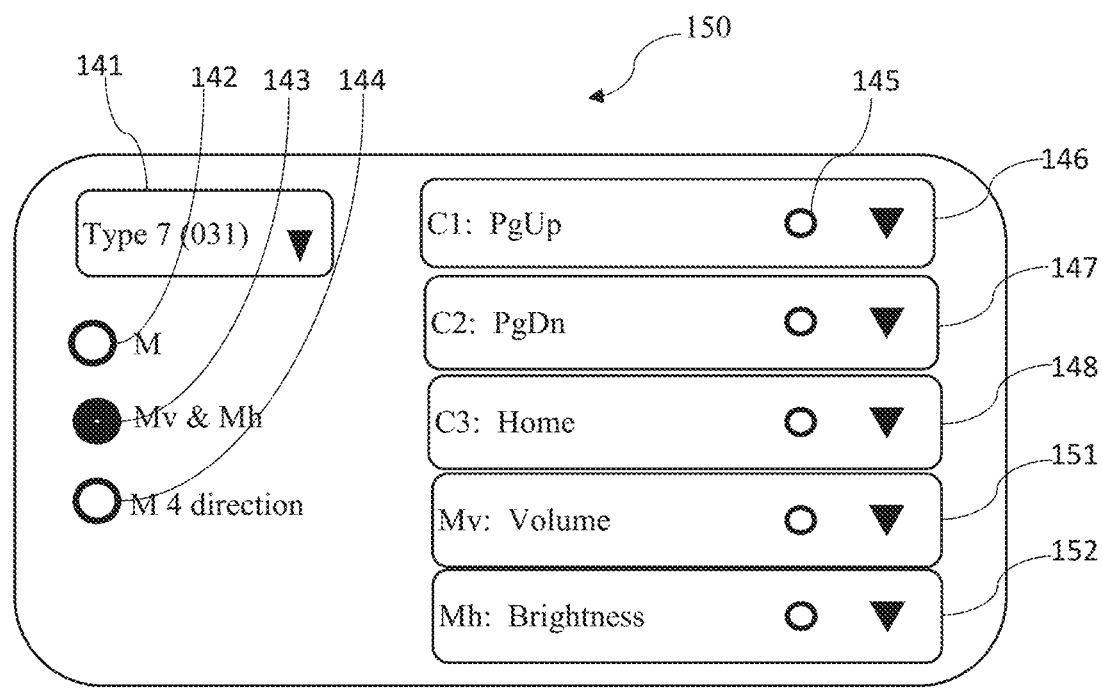

The ultra touch gesture function table is pre-configurable. FIG. 14A and FIG. 14B show an example of user interface for configuring the ultra touch gesture function table.

In Table 7, the quick type switching function are used for many types such as "Sw to Type 1", "Sw to previous type". They present a quick type switching instead of using the type-select operation.

Figure 3:
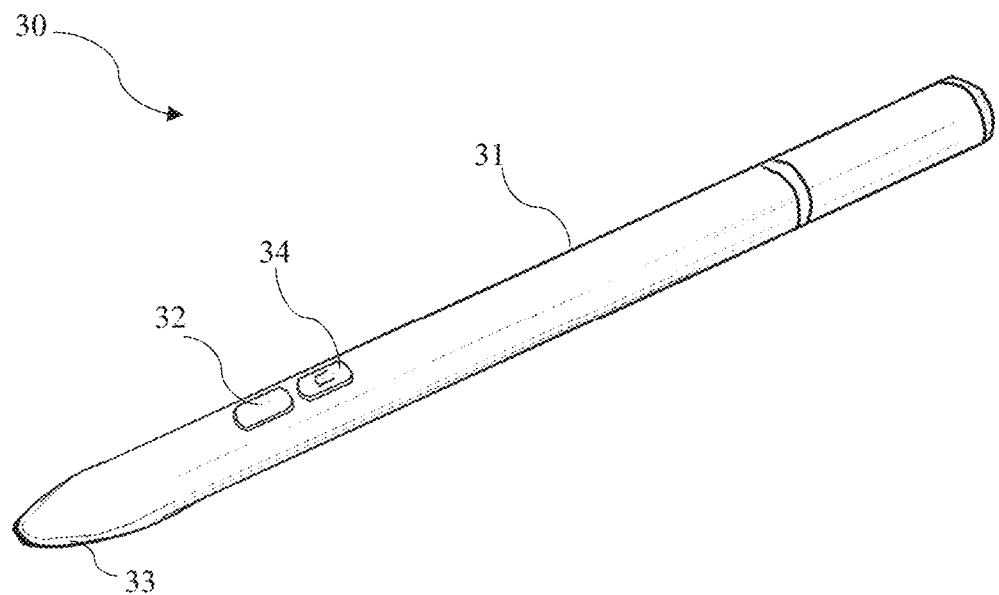
FIG. 3 is a perspective view of a computer pen mouse with left button and an ultra touch control button U.

FIG. 3 is a computer pen mouse 30, in accordance with the present invention. The pen mouse 30 has the optical sensor on the pen mouse base 33, left button 32 and an ultra touch control button 34. Pen mouse 30 is a mini mouse with pen shape and holding method. It is similar as the mini mouse 20 shown in FIG. 2B, the right button function of the pen mouse 30 is specified as clicking the ultra touch control button 34 during the ordinary mode. The physical scrolling wheel is replaced by an ultra touch gesture function.

The gesture function "Real size DPI" is specified for the gesture C2 in Type 10 in Table 7. It is used to enhance the experience of handwriting and drawing by the computer mouse. it is very important for the users to have a strong handwriting experience or drawing experience, The gesture function "Real size DPI" activates the software DPI adjustment function that adjusts cursor displacement data for the handwriting and drawing so that the real drawn tracks in inch on the display screen are equal to the mouse movement distance in inch on the mouse mat. It does not affect the functions which are not related to the handwriting such as normal cursor movement; zoom/rotate; scrolling; dragging.

To use this function, the display screen DPI or screen size and resolution information need to be entered and saved by the computer mouse application program. For example, a 25-inch display screen with 1080P resolution has the DPI=88.12.

Assuming that DPId is the display device DPI and DPIm is the computer mouse DPI. The software DPI adjusting coefficient C is assigned with C=DPId/DPIm. For the mouse movement data (X, Y), software DPI adjustment function does the adjusting: X1=int (C*X); Y1=int (C*Y) and reports the adjusted cursor displacement data with (X1, Y1) instead of (X, Y) wherein the int( ) function is a rounding to integer function. With adjusted displacement data (X1, Y1), the cursor displacement distance (Dx, Dy) on the display is same as the mouse displacement distance on the mouse mat.

Because "Real size DPI" function is specified as an ultra touch gesture function, they can be triggered by easy mouse operation.

The ultra touch gesture functions and operations for the pen mouse 30 are total same as that for the mini mouse 20 shown in FIG. 2B.

Figure 4:
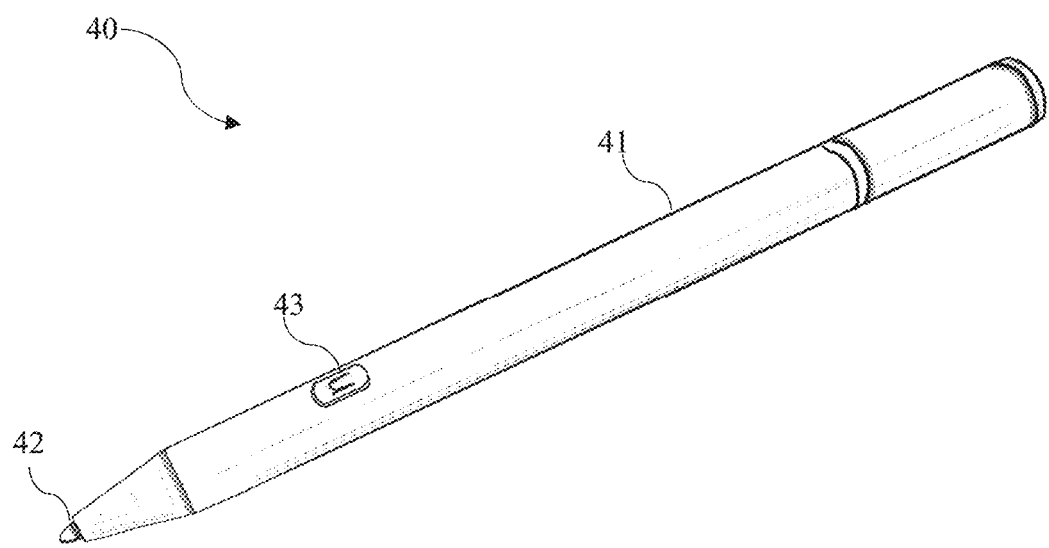
FIG. 4 is a perspective view of a computer digital stylus with an ultra touch control button U.

FIG. 4 is a computer digital stylus pen 40, in accordance with the present invention. The stylus pen has the pen tip or pencil tip 42 and an ultra touch control button 43 which is only one physical control button on the stylus.

The type-select operation for the stylus is specified as moving the stylus 40 on the touchscreen in a specific type pattern while holding the ultra touch control button U. The ultra touch end operation is specified as clicking the control button U during the type-select operation. The ultra touch flash-back operation is specified as long press the ultra touch control button U during the ordinary mode.

Table 7 shown in FIG. 13A and FIG. 13B is an example of the ultra touch gesture function table which can be used for both the digital stylus pen and the computer mini mouse.

Based on Table 7 shown in FIG. 13A and FIG. 13B, using the ultra touch gestures can perform most of the multi-touch gesture functions from one-finger to four-finger tap and drag gesture functions, zoom, rotate gesture functions as well as many system functions. It helps the users using the stylus to finish their most of the work without switching back and forth between putting down the stylus for using multi-touch operation with their fingers and picking up the stylus after multi-touch gestures. In addition, the ultra touch gesture functions enhance the stylus pen with many useful shortcut functions. The ultra touch gesture functions are expandable, configurable. The operation switching between the ultra touch types is easy and convenient. All this makes their work more comfortable and smoother.

Figure 5:
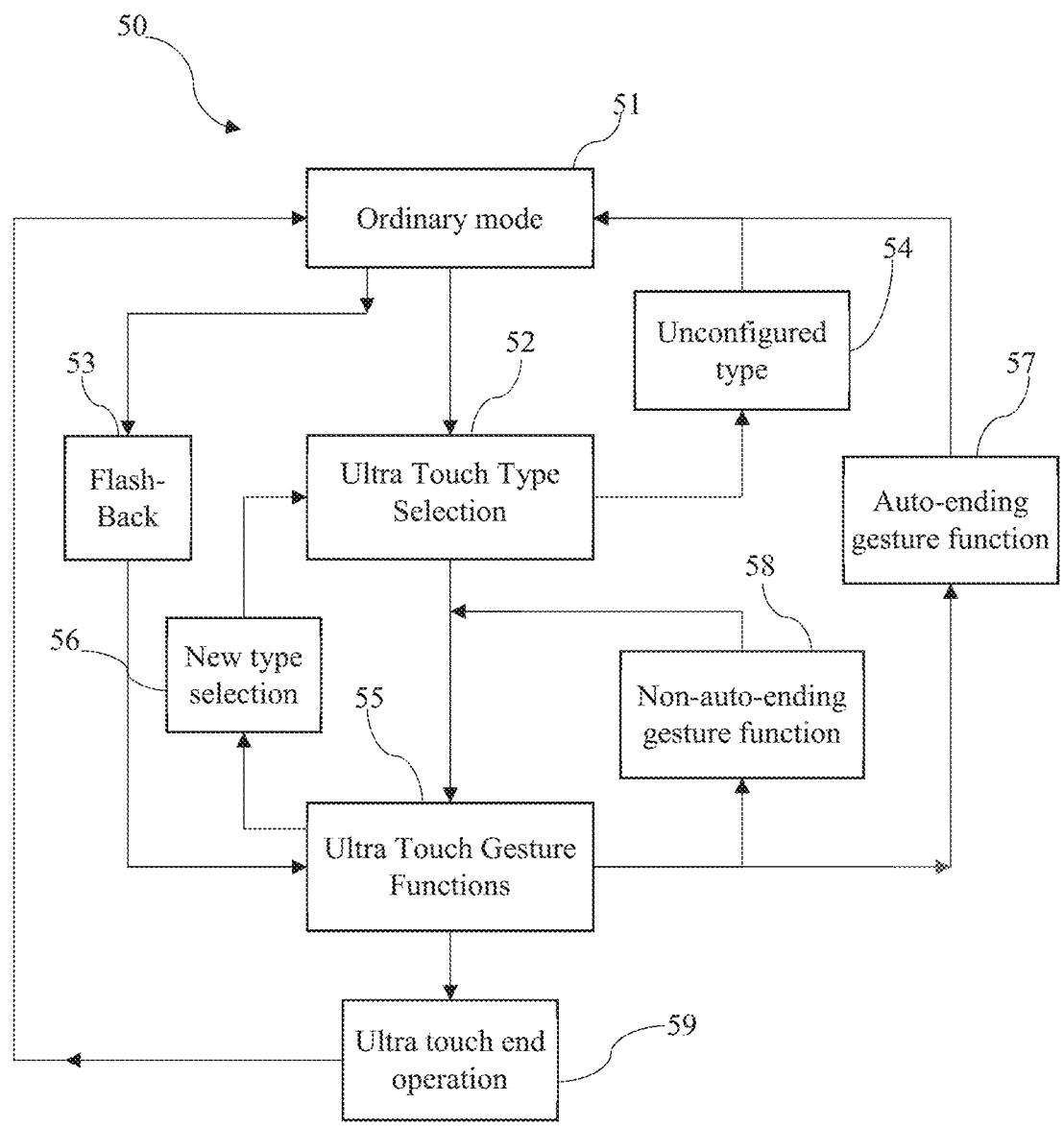
FIG. 5 is a flow chart for the ultra touch functions and input device working mode.

FIG. 5 is a basic flow chart 50 for the ultra touch gesture function and input device working mode. The default ultra_Mode is "Ordinary". The computer mouse works in its ordinary mode in the default mode which is shown by 51 in the flow chart 50.

The ultra touch type selection mode is shown by the step 52 in flow chart 50. It begins when the ultra touch control button U is pressed. The flow process sets ultra_Mode to "Select". The mouse movement data is processed and saved during the ultra touch type selection operation. At the end of the type-select operation. The mouse movement data is compared with the predefined ultra touch type patterns. If a matched type is found and configured, the computer mouse device application program saves the matched ultra touch type in ultra_Type and sets ultra_Mode="Gesture". Then flow process precedes to step 55. If no matched type is found or the selected type is unconfigured, the flow process sets ultra_Mode to "Ordinary" in the step 54 and then precedes to step 51 to the ordinary mode.

After selecting ultra touch type, the mouse works in the ultra touch gesture function mode. the flow process precedes to step 55. A group of ultra touch gestures are ready for driving the same number of ultra touch gesture functions for the selected ultra touch type, Mouse stays in the gesture function mode after execution of the non-auto-ending gesture function shown in step 58. If executed ultra touch gesture function is an auto-ending gesture function, the ultra Mode is set to "Ordinary" automatically at the end of the respective gesture shown in step 57. Then the flow process precedes back to step 51 and mouse works in the ordinary mode.

If an ultra touch gesture function is a type switching function, the flow process sets ultra_Type to a pre-configured type number at step 58 and display the gesture function list for the new type. Following the step 58, flow process precedes to step 55 and all the gesture functions for the new type can be used at once.

During the ultra touch gesture function mode, the type-select operation can choose a new type through the step 56. The ultra touch end operation is not required between the type switching.

When an ultra touch end operation is detected, the flow process precedes to step 59 and set ultra_Mode to "Ordinary". Then flow process precedes to step 51 for the ordinary mode.

When mouse works in the ordinary mode, an ultra touch flash-back operation sets ultra_Mode to "Gesture" in step 53 and return to the ultra touch gesture function mode with the ultra touch type ultra_Type in step 55.

Figure 6A:
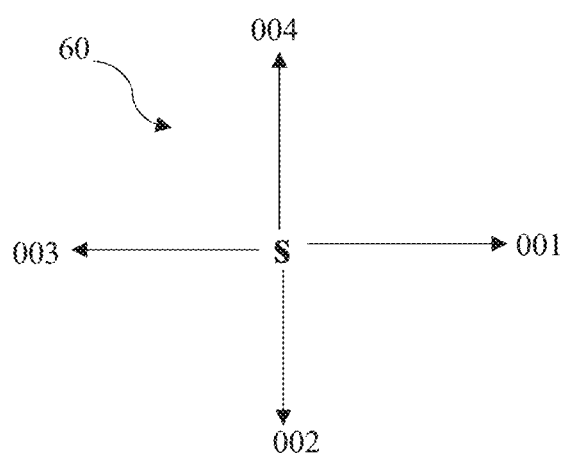
FIG. 6A~6D show the ultra touch type pattern definition with one to three directed line segment.

FIG. 6A shows the X-Y plane 60 wherein four basic ultra touch type patterns are defined. They have one directed line segment either vertical or horizontal. The variable k1k2k3 is used to represent the type pattern with three directed line segments. The variable k1k2k3 has three numbers and each number indicates the direction of one segment. The first number in the k1k2k3 represents the direction of the first segment. The second number in k1k2k3 represents the direction of the second segment. The third number in k1k2k3 represents the direction of the third segment. Each number in k1k2k3 has 5 possible value (0, 1, 2, 3, 4): 0 represents no segment existed; 1 represents a right-directed segment; 2 represents a downward directed segment; 3 represents a leftward directed segment; 4 represents an upward directed segment. They can he briefly represented as: 1—rightward; 2—downward; 3—leftward; 4—upward. When the first two numbers are zero and the third number is non-zero such as 003, the type pattern has only one directed line segment.

The diagram 60 shows 4 type patterns. Table 1 shown in FIG. 8A specifies the ultra touch type number for them: 001 in FIG. 6A indicates a directed segment to the right. It is specified as Type 1 (001). Similarly, 002 in FIG. 6A indicates a downward directed segment. It is specified as Type 2 (002). 003 indicates a leftward segment and it is specified as Type 3 (003). 004 indicates an upward segment and it is specified as Type 4 (004).

Figure 6B:
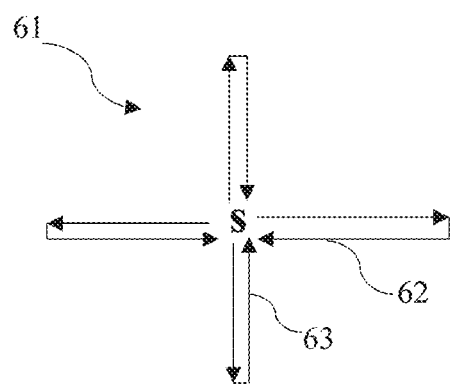
Figure 6C:
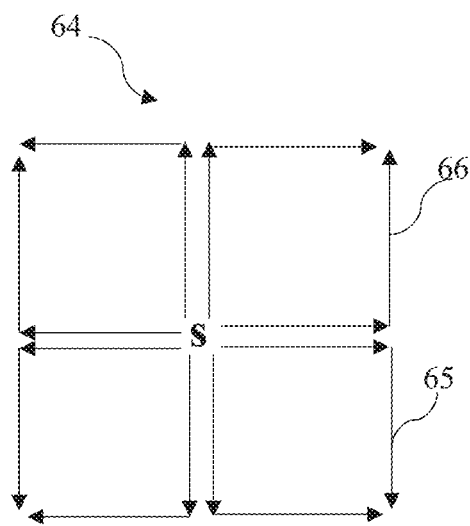

FIG. 6B and FIG. 6C show X-Y plane 61 and 62 wherein 12 ultra touch type patterns are defined as the patterns consisted of two directed line segments. When the first number of the k1k2k3 is zero and the second and third numbers are non-zero such as 042, the type pattern has two directed line segments.

The diagram 61 shown in FIG. 6B shows first 4 type patterns wherein two directed segments for each type pattern are opposite each other. Type pattern 62 indicates a type pattern wherein a segment from the S point to the right (1) is followed by a leftward segment (3) which is represented by the variable k1k2k3=013. This type pattern is specified as Type 5 (013) in FIG. 8B. Similarly, type pattern 63 indicates a type pattern wherein a downward segment from the S point (2) is followed by an upward segment (4) which is represented by the variable k1k2k3=024. This type pattern is specified as Type 6 (024), The type pattern with a leftward segment (3) followed by a segment to the right (1) is represented by k1k2k3=031 and is specified as Type 7 (031). Type 8 in FIG. 8B has the k1k2k3 value 042.It indicates a pattern with an upward segment (4) followed by a downward segment (2) which is specified as Type 8 (042).

FIG. 6C shows the X-Y plane 64 wherein eight type patterns with two directed segments are defined. In each type pattern, the second segment in the type pattern is perpendicular to the first segment. The type pattern 65 that the segment to the right (1) is followed by a downward segment (2) (k1k2k3=012) is specified as Type 9 (012) shown in FIG. 8B. Similarly, the type pattern 66 that a segment to the right (1) is followed by an upward segment (4) (k1k2k3=014) is specified as Type 10 (014).

The pattern that a downward segment (2) is followed by a segment to the right (1) (k1k2k3=021) is specified as Type 11 (021). The pattern with a downward segment (2) followed by a leftward segment (3) is for Type 12 (023). The pattern with a leftward segment (3) followed by a downward segment (2) is for Type 13 (032). The pattern with a leftward segment (3) followed by an upward segment (4) is for Type 14 (034). The pattern with an upward segment (4) followed by a segment to the right (1) is for Type 15 (041), The pattern with an upward segment (4) followed by a leftward segment (3) is for Type 16 (043).

Figure 6D:
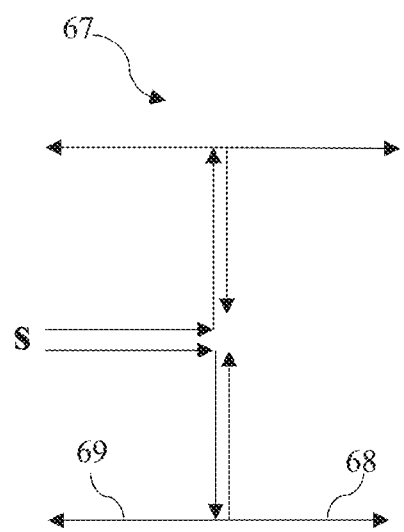

FIG. 6D shows the X-Y plane 67 wherein gives an example of the ultra touch type patterns which includes three directed line segments. For each of 12 type patterns with two directed segments shown in FIG. 6B and FIG. 6C, three new directed segments could be defined by adding the third directed line segment which has different direction from the second directed segment. so total 36 (12×3=36) new type patterns wherein each type pattern consists of three directed line segments can be defined, When the first number of the variable k1k2k3 is non-zero, the type pattern has three directed line segments.

Some examples of the new type patterns which include three directed line segments are shown in FIG. 6D: For Type 9 (k1k2k3=012), three new directed segment which have different direction from the second segment (2) are added to form the third segment. three new type patterns can be added: k1k2k3=121; k1k2k3=123 and k1k2k3=124. (It is noted that k1k2k3=122 does not meet the requirement.)

The type pattern k1k2k3=121 is shown by the pattern 68 in FIG. 6D. it is specified as Type 29 (121) shown in FIG. 8C. Similarly, the type pattern k1k2k3=123 is shown by 69 in FIG. 6D. It is specified as Type 30 (123), For Type 10, k1k2k3=014, when adding a segment as the third segment, three new types are specified as: Type 32 (141); Type 33 (142); Type 34 (143).

By using the same method, the specification of the rest type patterns which include three directed line segments is shown in FIG. 8C. FIG. 8C shows the table of the ultra touch type pattern with three-directed line segments.

Figure 7A:
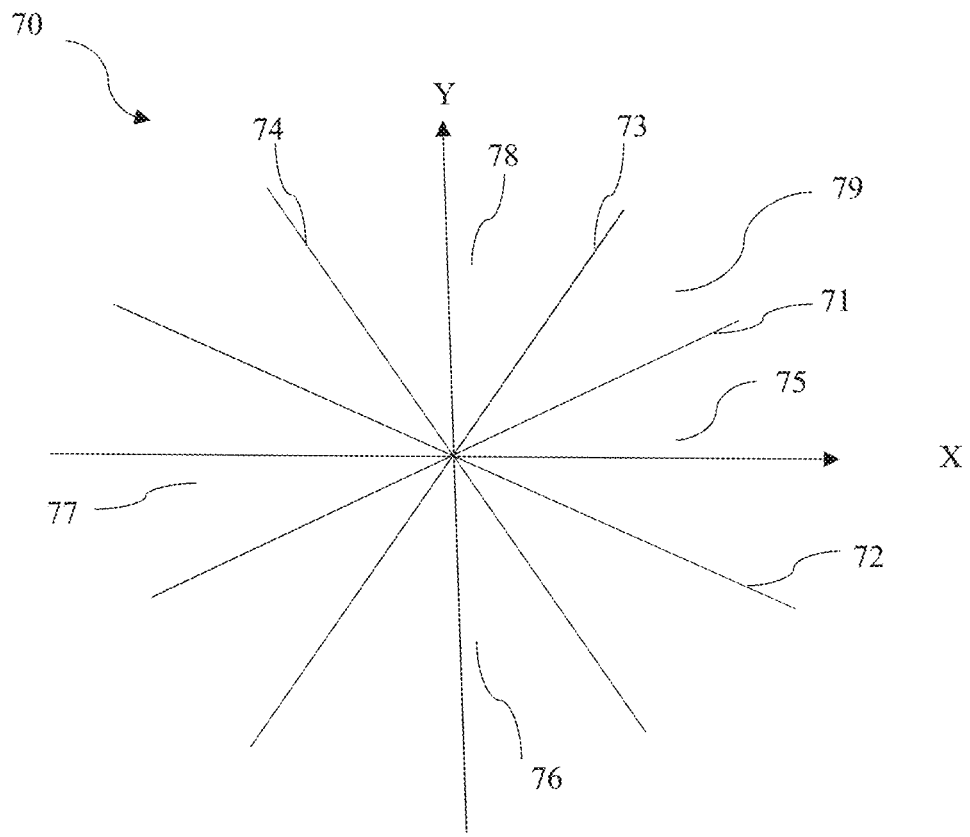
FIG. 7A shows an embodiment of practical directed line segment handling for the type-select operation.

FIG. 7A shows a X-Y plane 70 for an example of recognizing the ultra touch type selection operation. The type-select operation is specified as moving the computer mouse (or moving stylus on the touchscreen) while holding the control button U. the ultra_Mode is set to "Select" at the beginning of the type-select operation, it ends with releasing the control button U. Computer device application program saves the device movement data during type-select operation. If device movement pattern matches a type pattern in the set of ultra type patterns, the ultra touch type number is saved and ultra Mode is set to "Gesture". If the ultra touch type pattern set consists of the patterns wherein each type pattern contains one to three either vertical or horizontal segments shown in FIGS. 6A~6D, the device movement pattern for the type-select operation should be a pattern which has one to three either vertical or horizontal segments.

In practical using, device movement is hard to be strictly vertical or horizontal. For more practical considerations for recognizing one directed segment, the device movement (X, Y) in the X-Y plane 70 could be considered as vertical movement when the value of the vertical component Y (|Y|) is greater than the value of the horizontal component X (|X|). Similarly, the mouse movement (X, Y) could be considered as horizontal movement when the value of the horizontal component X (|X|) is greater than the value of the vertical component Y (|Y|).

In terms of mathematics, the accuracy coefficient A (>1) is used for the recognition of the type selection, The higher the A value, the higher the accuracy of the type selection recognition. The device displacement (X, Y) which meets the inequality |Y|>A|X| is the vertical movement vector. The direction of the segment (upward or downward) is determined by the sign of the Y.

The device displacement (X, Y) which meets the inequality |X|>A|Y| is the horizontal movement vector. The direction of the segment (leftward or to the right) is determined by the sign of X.

The device displacement (X, Y) which is neither the vertical nor the horizontal is unclear movement and is ignored.

In XY-plane 70, the accuracy coefficient A=2, any vector on two lines 73 and 74 meets the line equation: |Y|=2|X|. inequality |Y|>2|X| represents two areas in the plane 70: area 78 and area 76 (the areas between line 73 and line 74 and including Y axis). Any vector in these two areas (area 76 and area 78) meets the inequality |Y|>2|X| and is recognized as vertical segments. The segment is recognized as upward segment when Y>0 and the segment is recognized as downward segment when Y<0.

Similarly, any vector on the lines 71 and 72 meets the line equation: |X|=2|Y|. inequality |X|>2|Y| represents two areas in the plane 70: area 75 and area 77 (the areas between line 71 and line 72 and including X axis). Any vector in these two areas (area 75 and area 77) meets the inequality |X|>2|Y| and is recognized as horizontal segments. The segment is recognized as leftward segment when X<0 and the segment is recognized as the segment to the right when X>0.

If a vector does not meet both inequalities |Y|>2|X| and |X|>2|Y|, for example, it locates in area 79 shown in FIG. 7A, the vector (X, Y) is unclear movement and will be ignored.

Figure 7B:
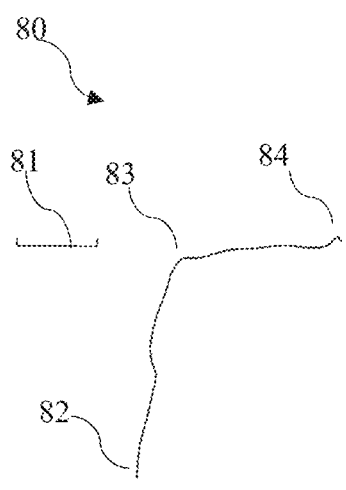
FIG. 7B is an example for an ultra touch type selection (Type 15: 041).

FIG. 7B is actual handwriting picture 80 for type selection which has two directed segments started from point 82 to the point 84. The mark 81 is the minimum length limitation which is used in the type-select operation recognition flow chart shown in FIG. 9A.

The picture 80 indicates a drawn type pattern with two sections. The first section starts from and ends at 83, During recognizing the type-select operation, any vector represented by the point on this section curve is in the area 78 in FIG. 7A. So, it is an upward segment (4). The second section starts from 83 and ends at 84. It indicates a directed segment to the right (1). Two directed segments (first segment with direction 4 followed by the segment with direction 1) drawn by the type-select operation matches the type pattern for Type 15 (041). Then it results that the type-select operation has selected Type 15 (041).

Tracks near the corner 83 indicate the transaction from vertical to horizontal. Some short vectors near the corner 83 are neither vertical nor horizontal, they can be filtered by the zone recognition shown in FIG. 7A or the minimum length setting 81 in FIG. 7B.

Figure 7C:
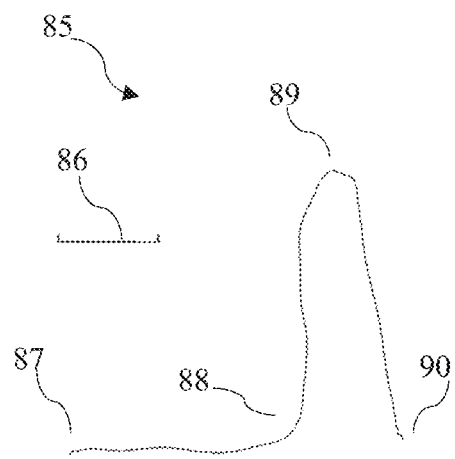
FIG. 7C is the second example for an ultra touch type selection (Type 33: 142).

FIG. 7C is actual handwriting picture 85 of three segments for the ultra touch type selection.

Figure 9A:
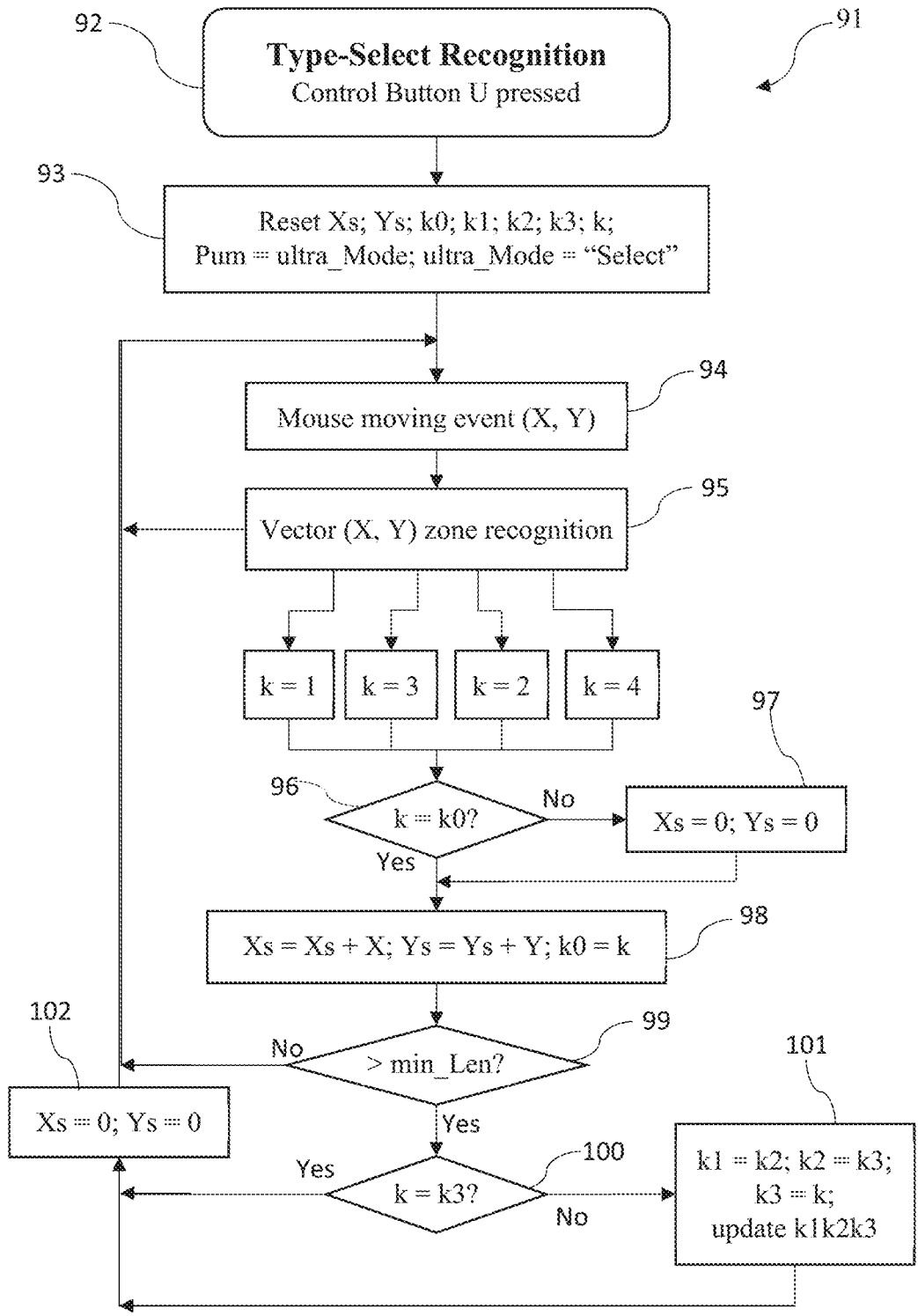
FIG. 9A and FIG. 9B is a flow chart of recognition processing of the ultra touch type selection.

The mark 86 is a minimum length limitation which is used in the type-select operation recognition shown in FIG. 9A.

The actual tracks 85 indicates a drawn type pattern with three sections. The first section is the section from 87 to 88. It indicates mouse movement to the right (a segment with direction 1). The second section is the section from 88 to 89. It indicates an upward movement (a segment with direction 4). The third section is the section from 89 to 90. It indicates a downward movement (the segment with direction 2). Three directed segments (1, 4 and 2) drawn by the type-select operation matches the type pattern for Type 33 (142) shown in FIG. 8C. Then it results that Type 33 (142) has been selected by the type-select operation.

Tracks near the corners 88 indicates the transaction from horizontal to vertical. Tracks near the turning point 89 indicates a turning point from upward to the downward. Usually the short vector at the track's transaction section are either non-clear or not-wanted. For example, some short vector indicates a horizontal movement to the right and this is not user wanted operation. Most noises during the type-select operation can be filtered by the zone recognition method shown in FIG. 7A and the minimum length requirement shown by 86 in FIG. 7C.

FIG. 8A shows Table 1 for an embodiment of assignment of type pattern with one directed segment. Four type patterns with one directed segment are shown in FIG. 6A as following. In Table 1, Type 1 is specified as a segment to the right (k1k2k3=001); Type 2 is specified as a downward segment (k1k2k3=002); Type 3 is specified as a leftward segment (k1k2k3=003); Type 4 is specified as an upward segment (k1k2k3=004);

They can be represented by expression of Type # (k1k2k3):

Type 1 (001); Type 2 (002); Type 3 (003); Type 4 (004).

FIG. 8B shows Table 2 for an embodiment of type pattern assignment with two directed segments. The type patterns with two directed segments are shown in FIG. 6B and FIG. 6C, in expression k1k2k3, when the first number is zero and the rest two numbers are non-zero such as 031, the type pattern has two directed line segments.

In Table 2, Type 5 is specified as the pattern with a segment to the right followed by a leftward segment (k1k2k3=013) and it is shown by 62 in X-Y plane 61; Similarly, Type 6 is specified as the pattern with k1k2k3=024 a downward segment followed by an upward segment which is shown by 63 in X-Y plane 61; Type 7 is specified as a pattern (031) and can be represent by Type 7 (031); Type 8 is specified as a pattern (042) and can be represent by Type 8 (042).

The other type specifications shown in FIG. 8B are: Type 9 (012); Type 10 (014); Type 11 (021); Type 12 (023); Type 13 (032); Type 14 (034); Type 15 (041); Type 16 (043).

For all type pattern consisting of two segments, the middle number is different from the third number which means two segments have different directions.

FIG. 8C shows Table 3 for an embodiment of type pattern with three directed line segments. For each of 12 type patterns with two directed segments, the third segment can be added in three different directions. So, three new type patterns can be specified.

Some examples of new type pattern with three directed line segments are shown in FIG. 6D: based on Type 9 (k1k2k3=012); three new type patterns: k1k2k3=121; k1k2k3=123 and k1k2k3=124. They are defined in Table 3 as: Type 29 (121); Type 30 (123); Type 31 (124). Similarly, based on Type 10 (014), three new type patterns are defined in Table 3 as: Type 32. (141); Type 33 (142) and Type 34 (143).

The type specification for the pattern with three directed segments are:

Type 17 (131); Type 18 (132); Type 19 (134);
Type 20 (241); Type 21 (242); Type 22 (243);
Type 23 (312); Type 24 (313); Type 25 (314);
Type 26 (421); Type 27 (423); Type 28 (424);
Type 29 (121); Type 30 (123); Type 31 (124);
Type 32 (141); Type 33 (142); Type 34 (143);
Type 35 (212); Type 36 (213); Type 37 (214);
Type 38 (231); Type 39 (232); Type 40 (234);
Type 41 (321); Type 42 (323); Type 43 (324);
Type 44 (341); Type 45 (342); Type 46 (343);
Type 47 (412); Type 48 (413); Type 49 (414);
Type 50 (431); Type 51 (432); Type 52 (434);

For all type patterns which include three directed line segments, the middle number is different from other two numbers which means two neighbored directed line segments have different direction.

Figure 9B:
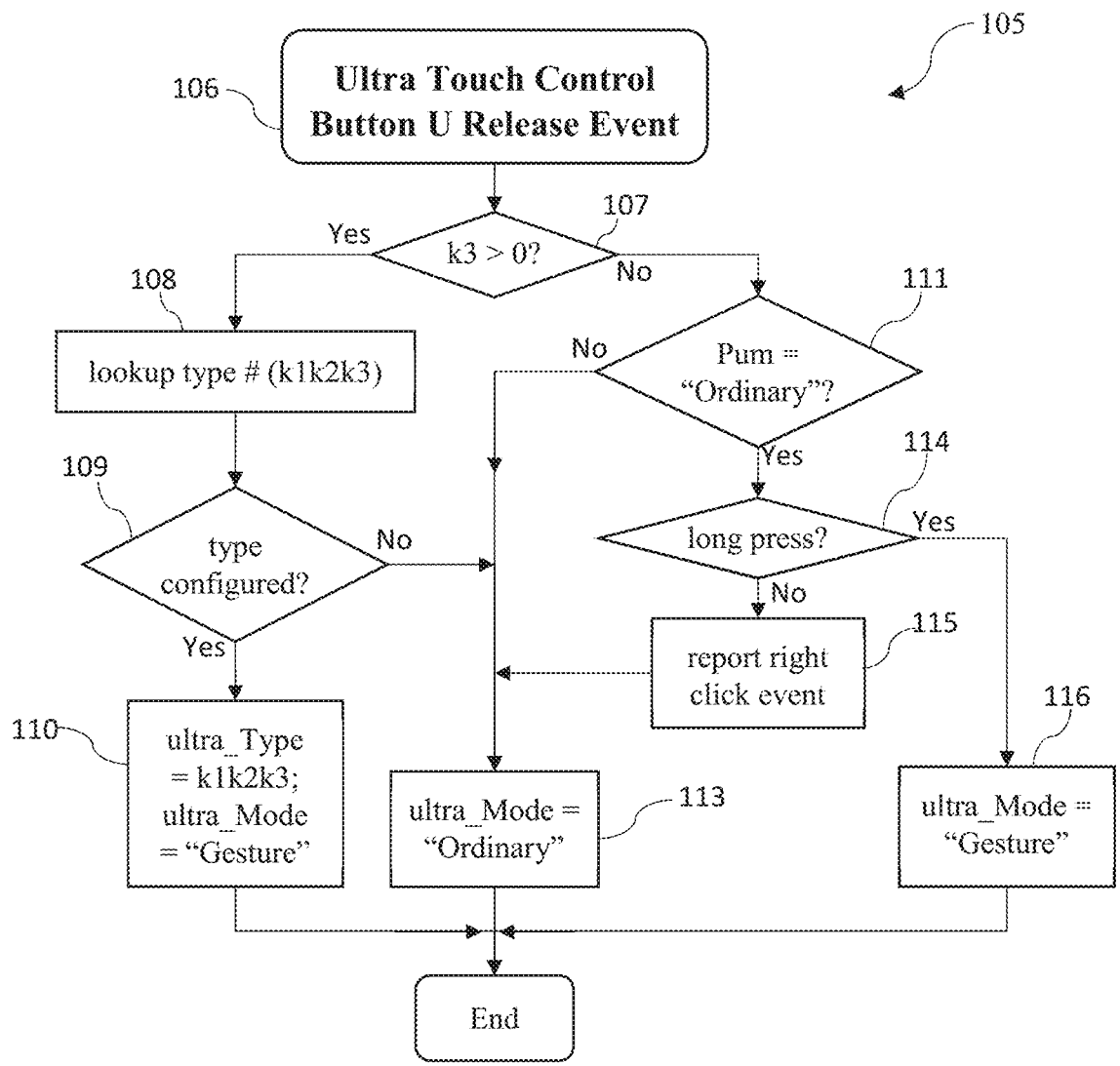

FIG. 9A and FIG. 9B are the brief flow charts 91 and 105 for recognition processing the ultra touch type selection by the computer mouse. It is the same as the computer stylus pen or pencil. FIG. 9A is the flow chart for recognition processing the mouse movement pattern while ultra touch control button being held. FIG. 9B is the flow chart for processing the event of ultra touch control button being released.

The type-select operation is specified as moving the computer mouse (or moving stylus on the touchscreen) while holding the control button U. the ultra Mode is set to "Select" at the beginning of the type-select operation. The type-select operation ends with releasing the control button U. Computer mouse device application program saves the mouse movement data during type-select operation.

When predefined ultra touch type pattern set consists of one to three directed line segments either vertical or horizontal shown in FIGS. 6A–6D, the mouse movement pattern for the type-select operation should be a pattern with one to three either vertical or horizontal segments.

The flow chart 91 shown in FIG. 9A begins at step 92 when the ultra touch control button U is pressed. When the ultra touch control button U is pressed, the flow process precedes to step 93 to reset the values of the Xs, Ys, k0, k1, k2, k3, k and save the pre-ultra_Mode (Pum=ultra_Mode). Xs and. Ys are the variables to accumulate the mouse displacement (X; Y). k1, k2 and k3 are the variables for saving each segment direction in k1k2k3. k0 and k are the state variables. The flow process also set the ultra_Mode to "Select" at step 93. Following step 93, the flow process proceeds to step 94 and waits the mouse displacement (X, Y). When a mouse movement event is reported, the direction of the mouse movement (X, Y) is recognized at step 95 by the method shown in FIG. 7A, five results can be drawn from the recognition: (1) it is a horizontal directed segment to the right: k=1; (2) it is a vertical downward segment: k=2; (3) it is a horizontal leftward segment: k=3; (4) it is a vertical upward segment: k=4; (5) its direction is unclear. If the direction of the vector (X, Y) is unclear, the flow process precedes back to 94 to wait new displacement (X, Y), the direction is clear, k is set to proper value for the direction and then the flow process precedes to step 96 to check if the direction has been changed from the previous direction k0. If direction is not changed, the mouse displacement is accumulated into (Xs, Ys) at step 98. If the direction has been changed, (Xs, Ys) is reset at step 97 and new direction is saved in step 98. After mouse displacement (X, Y) is accumulated, the flow process precedes to step 99 to check if the accumulated displacement (Xs, Ys) is longer than the pre-configured min_Len. If the length of (Xs, Ys) is shorter than min_Len, the flow process precedes back to step 94 to wait new mouse movement (X, Y). If the accumulated vector (Xs, Ys) is longer than min_Len, the flow process precedes to step 100 to check if the vector (Xs, Ys) is a new vector. If the vector (Xs, Ys) has the same direction as the previous direction k3, the mouse displacement (X, Y) is a just a continuation of the previous direction k3. For this reason, the flow process precedes to step 102 to reset Xs and Ys and then back to step 94 to wait new mouse displacement (X, Y). if the direction k of the vector (Xs, Ys) has been changed (k does not equal to k3), the flow process precedes to step 101 to update k1, k2 and k3 for the type pattern recognition. After updating in step 101, the flow process precedes to step 102 to reset Xs and Ys and then back to step 94 to wait new mouse displacement (X, Y). During the recognition process in 91, the flow processing 105 shown in FIG. 913 starts working whenever the ultra touch control button U releasing event is detected.

During the recognition process of the ultra touch type selection, most jitter and inaccuracy in the mouse movement can be filtered out by zone recognition at step 95 and min_Len checking at step 99 shown in FIG. 9A.

FIG. 9B show the flow chart 105 to process the event of the ultra touch control button being released.

Whenever the ultra touch control button U is released. The flow processing 105 starts working. The flow process first checks if variable k3 has been changed at step 107. The variable k3 has been reset when the ultra touch control button U is pressed. If variable k3 has been changed from 0 to a non-zero number, it means that during the ultra touch type-select operation, some legal type pattern has been drawn. Then the flow process precedes to step 108 to look up the type number (Type #) in the tables 8A-8C by using the value of k1k2k3, after getting the Type #, the flow process precedes to step 109 to check if the type is configured or not. If the selected ultra touch type has been configured already, the flow process precedes to step 110. the selected type number is saved in ultra_Type and the ultra_Mode is set to "Gesture" as the correct result of the type selection at step 110. If the type pattern is not configured yet, the flow process precedes to step 113 to set ultra Mode to "Ordinary". It indicates that the selected type is an unconfigured type.

If the variable k3 has not been changed in the checking step 107, it indicates that after control button U pressed (and/or held for a while), no mouse movement has been detected. The flow process precedes to step 111 to check when the ultra touch control button U is pressed, if the control button U is pressed during the ordinary mode, the Pum value is "Ordinary" which is set at the step 93 in the flow chart 91, then flow process check if the operation is a click or a long press operation in step 114. If the operation is a clicking the ultra touch control button U, the flow process reports a mouse right button clicking event to the system at step 115. Otherwise, the operation is a long press the ultra touch control button U which is specified as the ultra touch flash-back operation. The flow process then set ultra_Mode="Gesture" in step 116. This is a flash-back operation. The ultra touch type is the value of ultra_Type which is saved in step 110. If the control button U is pressed when mouse works in the ultra touch gesture function mode, the Pum value is "Gesture", it indicates an ultra touch end operation and the flow process precedes to step 113 and set the ultra_Mode to "Ordinary".

FIG. 10 shows Table 4 for an example of the alphanumeric letters for the ultra touch type patterns.

When using alphanumeric characters as the ultra touch type patterns, the ultra touch type can be recognized by calling the system handwriting text recognition function. When calling the system handwriting text recognition function, the some constrains can be added such as only one character is to be recognized, only searching the ultra touch type patterns set. When used for the mouse device application, some multi-stroke alphanumeric letters such as 4, f and i can be replace replaced by a similar unique single stroke pattern.

During the ultra touch type selection, the computer stylus application program calls the handwriting APIs with the real-time stylus data stream. The computer handwriting APIs process the stylus data stream to obtain recognition accuracy. After getting computer handwriting recognition results, the alphanumeric type pattern with the highest matching degree is automatically used as the ultra touch type.

In Table 4, 18 type patterns are specified as following:
Type 1 (1); Type 2 (2); Type 3 (3); Type 4 (4); Type 5 (5); Type 6 (6);
Type 7 (7); Type 8 (8); Type 9 (9); Type 10 (a); Type 11 (b); Type 12 (c);
Type 13 (d); Type 14 (e); Type 15 (f); Type 16 (g); Type 17 (h); Type 18 (i).

For example, writing "h" while holding the ultra touch control button U to select Type 17.

FIG. 11 shows Table 5 for the basic ultra touch gesture number assignment. For the mini mouse or pen mouse which include a left button and an ultra touch control button U, the possible ultra touch gestures used to drive the ultra touch gesture functions include: (C1) click left button; (C2) double click left button; (C3) press and hold left button; (M) move mouse in all direction while holding left button; (Mv) move mouse vertically while holding the left button; (Mh) move mouse horizontally while holding left button; (Mup) move mouse upward while holding left button; (Mdown) move mouse downward while holding left button; (Mleft) move mouse leftward while holding left button; (Mright) move mouse to the right while holding left button.

The gesture (M): move mouse in all direction while holding left button can be separated into the two independent gestures (Mv) and (Mh) or be separated into four independent gestures (Mup), (Mdown), (Mleft) and (Mright). So, there are 3 different options for choosing the ultra touch gestures for one ultra touch type:
The first options with 4 gestures: (C1), (C2), (C3), (M),
The second options with 5 gestures: (C1), (C2), (C3), (Mv) and (Mh).
The third options with 7 gestures: (C1), (C2), (C3), (Mup), (Mdown), (Mleft) and (Mright).

For the computer digital stylus pen or pencil which include only one button which is an ultra touch control button U, the possible ultra touch gestures used to drive the ultra touch gesture functions include: (C1) tap the stylus; (C2) double tap the stylus; (C3) tap and hold the stylus; (M) move stylus in all direction on touchscreen; (Mv) move stylus vertically on touchscreen; (Mh) move stylus horizontally on touchscreen; (Mup) move stylus upward on touchscreen; (Mdown) move stylus downward on touchscreen; (Mleft) move stylus leftward on touchscreen; (Mright) move stylus to the right on touchscreen. After using ultra touch gesture 4, both the mini mouse and stylus pen have the totally same options for choosing the ultra touch gestures for one ultra touch type.

For the computer mouse which include left and right buttons and an ultra touch control button the possible ultra touch gestures used to drive the ultra touch gesture functions include total 20 gestures. They are: (C1), (C2), (C3), (M), (Mv), (Mh), (Mup), (Mdown), (Mleft), (Wight), (Cr1), (Cr2), (Cr3), (Mr), (Mrv), (Mrh), (Mrup), (Mrdown), (Mrleft), (Mrright). Three different options for choosing the ultra touch gestures for a specific ultra touch type:
The first options with 8 gestures: (C1), (C2), (C3), (M), (C1), (C2) (M).
The second options with 10 gestures: (C1), (C2), (C3), (Mv), (Mh), (CH), (Cr2), (Cr3), (Mrv), (Mrh).
The third options with 14 gestures: (C1), (C2), (C3), (Mup), (Mdown), (Mleft), (Mright), (Cr1), (Cr2), (Cr3), (Mrup), (Mrdown), (Mrleft), (Mrright).

FIG. 12A and FIG. 12B show Table 6 for an embodiment of the ultra touch gesture function table for the mouse with left/right buttons and an ultra touch control button U such as the mouse shown in FIG. 1 or a mini mouse with left/right buttons and an ultra touch control button U.

The ultra touch gesture function table can be configured based on user's preference.

In Table 6, the vertical scroll wheel of the mouse can be replaced by an ultra touch gesture defined for Type 3 (003), the ultra touch gesture M (moving mouse while holding left button) drives the all directional scroll function. It presents the functions of the vertical; horizontal and diagonal scrolling. Besides the all directional scrolling, the ultra touch gesture also provides as one-finger drag function which can drag the display at any direction by the gesture M for Type 1. This give users more fun and more controllability in operation.

The ultra touch gesture function table is grouped based on the gesture function. It helps the users to remember and to use the gesture functions. For example, for Type 1 (001) in Table 6, all the gestures related to left finger are assigned to multi-touch one-finger gesture functions. all the gestures related to right finger are assigned to multi-touch two-finger gesture functions. Similarly, some common used bowser commands and functions are assigned together in Type 3 (003).

When selected Type 5 (013), the gesture C3 opens "One Note" application and then set ultra_Mode="Ordinary" to let the mouse working in the ordinary mode at once because it is an auto-ending gesture function.

In Table 6, all the gesture functions for the gesture Cr3 are specified as quick type switching. All types except Type 1 have the gesture function "Sw to Type 1" for the gesture Cr3. They present a quick type switching to Type 1. When the type is changed to Type 1, the previous type number is saved. For Type 1, the gesture Cr3 is specified as "Sw to previous type". It sets ultra Type to the saved previous type number.

FIG. 12C is an ultra touch gesture function list diagram 120 for the selected ultra touch type 3.

When the control variable func_Table=on and ultra_Mode="Gesture", the computer device application program displays the ultra touch gesture function list shown in FIG. 12C for the selected ultra touch type (Type 3 is selected) to help selecting the ultra touch gestures for the selected type.

When ultra_Mode is not "Gesture" or func_Table is not on, the gesture function list is hided.

FIG. 13A and FIG. 13B shows Table 7 for an embodiment of the ultra touch gesture function table which can be used for the mini mouse or pen mouse which has only a left button and an ultra touch control button U.

The right button click function of the normal computer mouse is specified as clicking the ultra touch control button U when the mouse works in the ordinary mode.

The physical scroll wheel is replaced by an ultra touch gesture function for ultra touch type 6. the ultra touch gesture M for Type 6 presents the kinctions of the vertical, horizontal and diagonal scrolling. Besides the all directional scrolling, the ultra touch gesture also provides one-finger drag function which can drag the display at any direction by the gesture M for Type 1. This give users more fun and more controllability in operation.

The ultra touch gesture function "Display gesture function table" specified in Type 10 toggles the control variable func_Table. After func_Table being set to on, the computer input device application program displays the ultra touch gesture function table shown in FIG. 13 for all the ultra touch types to help selecting the ultra touch type during the type-select operation and displays the ultra touch gesture function list such as that in FIG. 13C and FIG. 13D to help selecting the ultra touch gesture for the selected ultra touch types when mouse works in the ultra touch gesture function mode. If func_Table is off or ultra_Mode is "Ordinary", the gesture function table or list are hided.

The gesture function "Real size DPI" function in Type 10 (014) enables the software DPI adjusting for the handwriting and drawing works so that the cursor displacement distance on the display in inch is the same as the mouse displacement distance on the mouse mat in inch. It gives users stronger real experience and more precise during the handwriting and drawing, In Table 7, the gesture C3 for the types from 2 to 10 are specified as the type switching functions "Sw to Type 1" for quick type switching to Type 1. They present a quick type switching to Type 1 instead of using type-select operation. When the type is changed to Type 1, the previous type number is saved. For Type 1, the gesture C3 is specified as "Sw to previous type". It sets the new type number to the saved previous type number.

In Table 7, Types 12, 13 and 15 form a loop-linked group. Whenever selected one of these three types, the gesture C3 can change the type in the three types in a loop. For example, if Type 14 is selected, the gesture C3 changes the type to Type 12. In Type 12 the gesture C3 changes the type to Type 13. In Type 13 the gesture C3 changes the type to Type 14.

Table 7 can also be used for the computer digital stylus pen or pencil with an ultra touch control button U such as the stylus pen shown in FIG. 4. All the ultra touch gesture # listed in Table 7 also fit the computer digital pen or pencil.

For the computer digital stylus pen or pencil, the ultra touch function table extends the stylus pen or pencil to having most of the multi-touch functions which used to be operated by fingers. In addition, the ultra touch gesture functions enhance the stylus pen with many useful shortcut system functions. It helps the user using the stylus to finish their most of the work without switching back and forth between putting down the stylus and picking up the stylus.

Figures 13C, 13D:
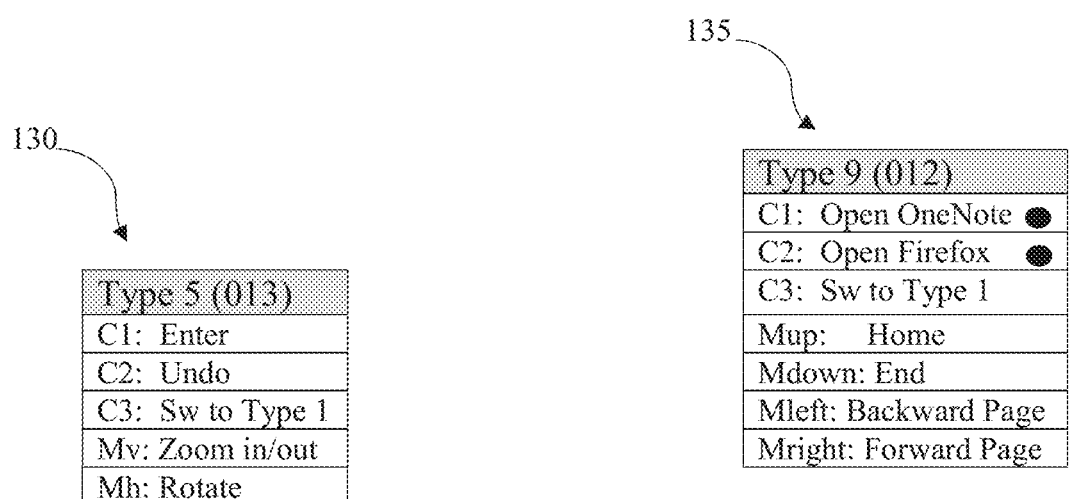
FIG. 13C is the ultra touch gesture function list for the ultra touch type 5 in the table 7.
FIG. 13D is the ultra touch gesture function list for the ultra touch type 9 in the table 7.

FIG. 13C is an ultra touch gesture function list 130 when the ultra touch type 5 is selected. If the control variable func_Table is set to on, after selecting the ultra touch type 5, the computer input device application program displays the ultra touch gesture function list 130 for Type 5 (013) which can help selecting the ultra touch gestures for the selected type.

For type 5 (013): the gesture C1 is used to trigger the keystroke command "Enter"; the esture C2 is used for "Undo" command; the gesture C3 is used to "Sw to Type 1"; the gesture My is used to "Zoom"; the gesture Mh is used to "Rotate";

FIG. 13D is the ultra touch gesture function list 135 for the ultra touch type 9 (012). When selected the ultra touch type 9 (012), the computer input device application program displays the ultra touch gesture function list 135 which can help selecting the ultra touch gestures for the selected type 9.

For Type 9 (012): the gesture C1 opens "OneNote" application and auto-ending; the gesture C2 opens "Firefox" application and auto-ending; the gesture C3 triggers "Sw to Type 1"; the gesture Mup triggers "Home"; the gesture Mdown triggers "End"; the gesture Mleft triggers "Backward Page"; the gesture Aright triggers "Forward Page command".

After execution of an auto-ending gesture function such as "opens OneNote" which is triggered by the gesture C1, the ultra_Mode Is set to "Ordinary" because the auto-ending property is on for the gesture function. After that, the ultra touch gesture function list is hided.

FIG. 14A and FIG. 14B are the example of the user interface 140 and 145 for configuring the ultra touch gesture function table.

The ultra touch gesture function table which maps the ultra touch gestures to the ultra touch gesture functions are pre-configurable. Users can re-arrange or change the mapping from ultra touch gesture to the gesture function based on their preference.

The item 141 in the user configure interface 140 is a drop-down list which lists the type from 1 to 52. Any type from 1 to 52 could be configured by users. The type patterns with one to three directed segments are specified in Tables 8A~8C. For example, Type 7 (031) is selected to be configured in FIG. 14A. If all the ultra touch gestures are marked as "TBD" for a specific ultra touch type, the type is not configured and the type-select operation for this type is ignored.

The ultra touch gesture of moving mouse while holding the left button of the mouse can be configured as one of three different options: (1) one gesture with all directional moving M; (2) two gestures with vertical and horizontal moving: My and Mh; (3) 4 direction moving: Mup, Mdown, Mleft and Mright. Only one option can be chosen. There is a toggle group control of radio buttons by which users can choose the moving gesture option, The default option is the gesture M shown in FIG. 14A The default user interface is for the normal ultra touch type wherein the gesture "M" is checked by default. Four drop-down list control items (146, 147, 148 and 149) are used to specify four ultra touch gesture functions: (C1) click left button; (C2) double click left button; (C3) press and hold left button and (M) move the mouse while holding left button. For example, when clicking the drop-down list control 147 of "PgDn", the ultra touch gesture function for the gesture C2 can be chosen from the drop-down list of pre-defined ultra touch gesture functions. After clicking the drop-down list control 149 for the gesture M, the all directional gesture function for the gesture M can be chosen from the list of pre-defined all-directional control gesture functions.

For every gesture function there is a checkbox for setting the auto-ending property. If the auto-ending is checked, executing the corresponding gesture for the gesture function will automatically trigger an ultra touch end operation after the gesture function.

If the radio button "Mv & Mh" 143 is checked, the drop list 149 is replaced by two new drop lists 151 and 152 shown in FIG. 14B. The ultra touch type 7 includes 5 ultra touch gesture functions for the gestures: C1, C2, C3, Mv and Mh. By clicking the drop-down list 151, the ultra touch gesture function for the gesture My can be selected. Similarly, the ultra touch gesture function for the gesture Mh can be selected from the drop-down list 152.

If the radio button "M4 direction" 144 is checked, the drop lists 151 and 152 in FIG. 14B are replaced by four new drop-down lists for the gestures: Mup, Mdown, Mleft and Mright.

The methods and systems described above can be used alone or in various combinations. The methods may be implemented singularly or by a combination of hardware, software, and/or firmware.

While this invention has been described in terms of several preferred embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer system with ultra touch gesture function comprising:
    a computer mouse including one ultra touch control button which initiates the ultra touch functions;
    a computer mouse device application program executable on the computer processor configured to:
        create a control variable ultra_Mode with three possible values: {Ordinary=0, Select=1, Gesture=2} wherein "Ordinary" is the default value;
        execute the normal mouse functions such as cursor movement, left key, right key functions, scroll wheel function when ultra_Mode="Ordinary";
        set ultra_Mode="Select" when the ultra touch control button is pressed;
        define an ultra touch end operation as clicking the ultra touch control button; set ultra_Mode="Ordinary" whenever detected an ultra touch end operation;
        define an ultra touch type pattern set during ultra_Mode="Select" wherein each ultra touch type pattern is a unique tracking pattern and has a pattern number;
        save the mouse movement data during ultra_Mode="Select" as ultra touch type select operation data;
        compare the ultra touch type select operation data with the ultra touch type pattern set to find the matched ultra touch type pattern at the end of ultra touch type select operation when the ultra touch control button is released; set ultra_Mode="Gesture" when a matching type pattern is found; set ultra_Mode="Ordinary" when no matching type pattern is found;
        define an ultra touch gesture set during ultra_Mode="Gesture" wherein each gesture is a unique operation on the mouse button or mouse movement or the combinations of both;
        define an ultra touch gesture function set for each ultra touch type wherein each ultra touch gesture function is driven by a specific ultra touch gesture and each ultra touch gesture function has a configurable auto-ending property with two possible values (off=0; on=1);
        execute the specific ultra touch gesture function when detected an ultra touch gesture during ultra_Mode="Gesture" and automatically trigger an ultra touch end operation at end of ultra touch gesture if auto-ending property of the ultra touch gesture function is on;
        define one ultra touch gesture function for a specific ultra touch type as a type switching function that changes the type to a pre-configured type during ultra_Mode="Gesture";
        create a control variable func_Table with two possible values: {off=0, on=1} with a default value of on; display the ultra touch gesture function table for all ultra touch types when func_Table=on and ultra_Mode="Select"; display the ultra touch gesture function list for the selected ultra touch type when func_Table=on and ultra_Mode="Gesture"; hide the ultra touch gesture function table when func_Table=off or ultra_Mode is "Ordinary";
        define one ultra touch gesture function as toggling a control variable func_Table between on and off.

2. The computer system according to claim 1, wherein each ultra touch type pattern is an alphanumeric letter.

3. The computer system according to claim 1, wherein each ultra touch type pattern consists of one to three directed line segments wherein each segment is longer than a pre-configured minimum length and is either vertical or horizontal, the second directed segment has different direction from other segments.

4. The computer system according to claim 1, wherein a segment in the type pattern drawn is recognized as vertical when the segment vector (X, Y) meets the inequality $|Y|>A|X|$ wherein A>1; a segment in the type pattern drawn is recognized as horizontal when the segment vector (X, Y) meets the inequality $|X|>A|Y|$ wherein A>1.

5. The computer system according to claim 1, wherein the ultra touch gesture operations on the mouse during the ultra touch gesture function mode include: (1) click left or right button; (2) double click left or right button; (3) press and hold left or right button; (4) move mouse while holding left or right button; (5) scroll the mouse wheel.

6. The computer system according to claim 1, wherein the ultra touch gesture functions include: (1) multi-touch tap gesture functions; (2) multi-touch drag functions; (3) keyboard keystroke functions; (4) system functions and commands; (5) display zoom and rotate functions; (6) slider control functions; (7) knob or dial control functions.

7. The computer system according to claim 1, wherein the ultra touch gesture functions in the ultra touch gesture function table are pre-configurable.

8. The computer system according to claim 1, wherein the right button of a mouse is replaced with the ultra touch control button and the right button click function is specified as clicking the ultra touch control button when the mouse is in the ordinary mode and ultra_Mode="Ordinary".

9. The computer system according to claim 1, wherein the computer mouse is one of following mouse types with an ultra touch control button said U: a normal size mouse; a mini mouse; a pen mouse.

10. The computer system according to claim 1, wherein one ultra touch gesture function is specified as toggling mouse DPI mode between normal mode and "Real size DPI" handwriting mode: In the "Real size DPI" mode, the drawn tracks in inches on the display screen is adjusted to the same as the mouse movement distance in inches on the mouse mat during handwritten and drawing.

11. A computer system with ultra touch gesture function comprising:
- a digital stylus pen or pencil working on the touchscreen including an ultra touch control button which initiates the ultra touch functions;
- a computer digital stylus device application program executable on the computer processor configured to:
- create a control variable ultra_Mode with three possible values: {Ordinary=0, Select=1, Gesture=2} wherein "Ordinary" is the default value;
- execute the normal stylus functions when ultra_Mode="Ordinary";
- set ultra_Mode="Select" when the ultra touch control button is pressed;
- define an ultra touch end operation as clicking the ultra touch control button when ultra_Mode="Gesture"; set ultra_Mode="Ordinary" whenever detected an ultra touch end operation;
- define an ultra touch type pattern set during ultra_Mode="Select" wherein each ultra touch type pattern is a unique tracking pattern and has a pattern number;
- save the data of stylus movement on the touch screen during ultra_Mode="Select" as ultra touch type select operation data;
- compare the ultra touch type select operation data with the ultra touch type pattern set to find the matched ultra touch type pattern at the end of ultra touch type select operation when the ultra touch control button is released; set ultra_Mode="Gesture" when a matching type pattern is found; set ultra_Mode="Ordinary" when no matching type pattern is found;
- define an ultra touch gesture set during ultra_Mode="Gesture" wherein each gesture is a unique operation such as stylus tap gesture or drag gesture;
- define an ultra touch gesture function set for each ultra touch type wherein each ultra touch gesture function is driven by a specific ultra touch gesture and each ultra touch gesture function has a configurable auto-ending property with two possible values (off=0; on=1); execute the specific ultra touch gesture function when detected an ultra touch gesture during ultra_Mode="Gesture" and automatically trigger an ultra touch end operation at end of ultra touch gesture if the auto-ending property of the ultra touch gesture function is on;
- define one ultra touch gesture function for a specific ultra touch type as a type switching function that changes the type to a pre-configured type during ultra_Mode="Gesture";
- create a control variable func_Table with two possible values: {off=0, on=1} with a default value of on; display the ultra touch gesture function table for all ultra touch types when func_Table=on and ultra_Mode="Select"; display the ultra touch gesture function list for the selected ultra touch type when func_Table=on and ultra_Mode="Gesture"; hide the ultra touch gesture function table when func_Table=off or ultra_Mode is "Ordinary";
- define one ultra touch gesture function as toggling a control variable func_Table between on and off;
- define the ultra touch flash-back operation as long press the ultra touch control button when ultra_Mode is "Ordinary"; set ultra_Mode="Gesture" whenever detected an ultra touch flash-back operation.

12. The computer system according to claim 11, wherein each ultra touch type pattern is an alphanumeric letter.

13. The computer system according to claim 11, wherein each ultra touch type pattern consists of one to three directed line segments wherein each segment is longer than a pre-configured minimum length and is either vertical or horizontal, the second directed segment has different direction from other segments.

14. The computer system according to claim 11, wherein a segment in the type pattern drawn is recognized as vertical when the segment vector (X, Y) meets the inequality $|Y|>A|X|$ wherein $A>1$; a segment in the type pattern drawn is recognized as horizontal when the segment vector (X, Y) meets the inequality $|X|>A|Y|$ wherein $A>1$.

15. The computer system according to claim 11, wherein each ultra touch type pattern is a letter or number and the pattern is uniquely identified by the computer digital stylus device application program with the aid of the handwriting recognition software module in the system.

16. The computer system according to claim 11, wherein the ultra touch gestures on the stylus during the ultra touch gesture function mode include: (1) tap the stylus on the screen; (2) double tap the stylus on the screen; (3) tap and hold the stylus on the screen; (4) drag the stylus on the screen.

17. The computer system according to claim 11, wherein the ultra touch gesture functions include: (1) multi-touch tap gesture functions; (2) multi-touch drag functions; (3) keyboard keystroke functions; (4) system functions and commands; (5) display zoom and rotate functions; (6) slider control functions; (7) knob or dial control functions.

18. The computer system according to claim 11, wherein clicking ultra touch control button when ultra_Mode is "Ordinary" is specified as triggering a preconfigured system command or function.

19. The computer system according to claim 11, wherein the ultra touch gesture functions in the ultra touch gesture function table are pre-configurable.

* * * * *